(12) United States Patent
Zong et al.

(10) Patent No.: US 10,674,349 B2
(45) Date of Patent: Jun. 2, 2020

(54) SUBSCRIPTION UPDATE METHOD, DEVICE, AND SYSTEM

(71) Applicant: Huawei Technologies Co., Ltd., Shenzhen (CN)

(72) Inventors: Zaifeng Zong, Nanjing (CN); Caixia Qi, Shanghai (CN); Fenqin Zhu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/448,403

(22) Filed: Jun. 21, 2019

(65) Prior Publication Data

US 2019/0349744 A1 Nov. 14, 2019

Related U.S. Application Data

(63) Continuation of application No. PCT/CN2019/078455, filed on Mar. 18, 2019.

(30) Foreign Application Priority Data

May 11, 2018 (CN) .......................... 2018 1 0450232

(51) Int. Cl.
*H04W 8/12* (2009.01)
*H04W 8/20* (2009.01)
(Continued)

(52) U.S. Cl.
CPC ........... *H04W 8/12* (2013.01); *H04L 61/1511* (2013.01); *H04L 61/2007* (2013.01);
(Continued)

(58) Field of Classification Search
CPC ... H04W 8/12; H04W 204/16; H04W 68/005; H04W 80/10; H04L 61/1511; H04L 61/2007; H04M 3/42195
See application file for complete search history.

(56) References Cited

U.S. PATENT DOCUMENTS 8,363,619 B2 * 1/2013 Zhang .................... H04W 8/20
370/331
8,792,892 B2 * 7/2014 Wu ................... H04W 36/0055
370/331
(Continued)

FOREIGN PATENT DOCUMENTS

CN 101562578 A 10/2009
CN 101835133 A 9/2010
(Continued)

OTHER PUBLICATIONS

"3rd Generation Partnership Project; Technical Specification Group Core Network and Terminals; 5G Systems; Access and Mobility Management Services; Stage 3 (Release 15)," 3GPP TS 29.518 V1.1.0, pp. 1-116, pub. Apr. 2018 (Year: 2018).*
(Continued)

*Primary Examiner* — Asad M Nawaz
*Assistant Examiner* — Thomas R Cairns
(74) *Attorney, Agent, or Firm* — Conley Rose, P. C.

(57) ABSTRACT

A subscription update method, device, and system, where the method is performed by a first event notification network element and includes: determining that a notification condition of a first subscription event of a first terminal is met; obtaining first callback address information of a target subscription network element; and sending a first message to the target subscription network element based on the first callback address information, where the first message carries an identifier of the first terminal and a first event notification of the first subscription event, and the identifier of the first terminal is used to correlate the first event notification with the first terminal.

21 Claims, 10 Drawing Sheets

(51) Int. Cl.
    H04W 4/16      (2009.01)
    H04W 80/10     (2009.01)
    H04M 3/42      (2006.01)
    H04L 29/12     (2006.01)
    H04W 68/00     (2009.01)

(52) U.S. Cl.
    CPC ......... *H04M 3/42195* (2013.01); *H04W 4/16* (2013.01); *H04W 8/20* (2013.01); *H04W 68/005* (2013.01); *H04W 80/10* (2013.01)

(56) References Cited

U.S. PATENT DOCUMENTS

| | | | |
|---|---|---|---|
| 10,045,388 B2* | 8/2018 | Jeong | H04W 76/10 |
| 10,285,048 B2* | 5/2019 | Avula | H04W 24/04 |
| 2015/0363724 A1 | 12/2015 | Chatterjee et al. | |
| 2018/0098279 A1 | 4/2018 | Edge | |
| 2018/0270778 A1* | 9/2018 | Bharatia | H04W 36/0011 |
| 2019/0124040 A1* | 4/2019 | Avula | H04W 76/12 |

FOREIGN PATENT DOCUMENTS

| | | |
|---|---|---|
| CN | 101931939 A | 12/2010 |
| CN | 107018542 A | 8/2017 |
| WO | 2019196813 A1 | 10/2019 |

OTHER PUBLICATIONS

Machine Translation and Abstract of Chinese Publication No. CN101835133, Sep. 15, 2010, 17 pages.
Huawei, et al., "Subscription status notification for Event Exposure service" S2-183998, 3GPP TSG-SA WG2 Meeting #127, Apr. 16-20, 2018, Sanya, China, 10 pages.
Foreign Communication From A Counterpart Application, Chinese Application No. 201910198024.5, Chinese Office Action dated Oct. 11, 2019, 7 pages.
Machine Translation and Abstract of Chinese Publication No. CN101562578, Oct. 21, 2009, 24 pages.
Machine Translation and Abstract of Chinese Publication No. CN101931939, Dec. 29, 2010, 23 pages.
Machine Translation and Abstract of Chinese Publication No. CN107018542, Aug. 4, 2017, 32 pages.
"3rd Generation Partnership Project; Technical Specification Group Services and System Aspects; System Architecture for the 5G System; Stage 2 (Release 15)," 3GPP TS 23.501, V15.1.0, Mar. 2018, 201 pages.
"3rd Generation Partnership Project; Technical Specification Group Services and System Aspects; Policy and Charging Control Framework for the 5G System; Stage 2 (Release 15)," 3GPP TS 23.503 V15.1.0, Mar. 2018, 65 pages.
"3rd Generation Partnership Project; Technical Specification Group Core Network and Terminals; 5G System; Session Management Services, Stage 3 (Release 15)," 3GPP TS 29.502 V1.1.0, Apr. 2018, 107 pages.
"3rd Generation Partnership Project; Technical Specification Group Core Network and Terminals; 5G System; Unified Data Management Services, Stage 3 (Release 15)," 3GPP TS 29.503 V0.6.1, May 2018, 103 pages.
"3rd Generation Partnership Project; Technical Specification Group Services and System Aspects; Procedures for the 5G System; Stage 2 (Release 15)," 3GPP TS 23.502 V15.1.0, Mar. 2018, 285 pages.
Huawei, et al., "Pseudo CR on TS 23.502 for updating registration procedures with NF service operation invocations," SA WG2 Meeting #122, S2-174161, Jun. 26-30, 2017, San Jose Del Cabo, Mexico, 16 pages.
Huawei, et al., "TS 23.502 SMF information context synchronization between old AMF and new AMF," S2-177136, SA WG2 Meeting #123, Oct. 23-27, 2017, Ljubljana, Slovenia, 17 pages.
Samsung, "TS 23.502: Proactive notification of UE reachability toward SMF," S2-176082, SA WG2 Meeting #122Bis, Aug. 21-25, 2017, Sophia Antipolis, France, 8 pages.
Huawei, "Interim agreement on HO and TAU principles," S2-166674, SA WG2 Meeting #118, Nov. 14-18, 2016 Rene, USA, 7 pages.
LG Electronics, "TS 23.502: DN authorization and PDU session anchor relocation," S2-174591, SA WG2 Meeting #122, May 26-30, 2017, San Jose Dei Cabo, Mexico, 11 pages.
Huawei, "Informing Event Subscription Deletion from NF Service Producer," C4-187158, 3GPP TSG CT WG4 Meeting #86bis, Vilnius, Lithuania, Oct. 15-19, 2018, 5 pages.

* cited by examiner

SUBSCRIPTION UPDATE METHOD, DEVICE, AND SYSTEM

CROSS-REFERENCE TO RELATED APPLICATIONS

This application is a continuation of International Patent Application No. PCT/CN2019/078455, filed on Mar. 18, 2019, which claims priority to Chinese Patent Application No. 201810450232.5, filed on May 11, 2018. The disclosures of the aforementioned applications are hereby incorporated by reference in their entireties.

TECHNICAL FIELD

This application relates to the field of communications technologies, and in particular, to a subscription update method, device, and system.

BACKGROUND

In some approaches, an access and mobility management function (AMF) network element serving a terminal may subscribe, according to a requirement, to an event related to the terminal from an event notification network element such as a session management function (SMF) network element, a unified data management (UDM) network element, or a policy control function (PCF) network element. When subscribing to an event, the AMF network element sends a subscription request to the event notification network element. The subscription request carries subscription information, related to the terminal, of the AMF network element, for example, information about a subscription event of the terminal, callback address information, related to the subscription event, of the AMF network element, and a notification correlation identity (ID) allocated by the AMF network element to the subscription event. Further, the event notification network element sends a subscription response to the AMF network element. The subscription response carries a subscription correlation ID allocated by the event notification network element to the subscription event, and the like. In this case, when a notification condition of the subscription event is met, the event notification network element sends, based on the callback address information, related to the terminal, of the AMF network element, an event notification and the notification correlation identity to the AMF network element that has subscribed to the event. The AMF network element correlates the event notification with the subscription event based on the notification correlation identity.

In addition, in some approaches, in a scenario in which a terminal has migrated from a source AMF network element to a target AMF network element, because an event notification network element still stores subscription information, related to the terminal, of the source AMF network element when a notification condition of a subscription event is met, the event notification network element still sends an event notification of the subscription event to a source subscription network element based on the stored subscription information, related to the terminal, of the source AMF network element. As a result, a target subscription network element currently serving the terminal cannot learn the event notification of the subscription event in a timely manner, and therefore cannot process the corresponding subscription event in a timely manner.

Therefore, how to perform a subscription update such that a target subscription network element can learn an event notification of a subscription event in a timely manner in a scenario in which a terminal has migrated from a source subscription network element to the target subscription network element is a problem that needs to be urgently resolved currently.

SUMMARY

Embodiments of this application provide a subscription update method, device, and system, such that a target subscription network element can learn of a subscription event in a timely manner in a scenario in which a terminal has migrated from a source subscription network element to the target subscription network element.

To achieve the foregoing objective, the following technical solutions are used in the embodiments of this application.

According to a first aspect, a subscription update method is provided. The method is applied to a scenario in which a first terminal migrates from a source subscription network element to a target subscription network element. The method includes determining, by a first event notification network element, that a notification condition of a first subscription event of the first terminal is met; obtaining, by the first event notification network element, first callback address information of the target subscription network element; and sending, by the first event notification network element, a first message to the target subscription network element based on the first callback address information, where the first message carries an identifier of the first terminal and a first event notification of the first subscription event, and the identifier of the first terminal is used to correlate the first event notification with the first terminal. In this solution, in the scenario in which the first terminal has migrated from the source subscription network element to the target subscription network element, the first event notification network element may obtain the first callback address information of the target subscription network element, and send the first event notification and the identifier of the first terminal to the target subscription network element based on the first callback address information of the target subscription network element, where the identifier of the first terminal is used to correlate the first event notification with the first terminal. In this way, the target subscription network element can learn an event notification of the first subscription event in a timely manner based on the identifier of the first terminal and the first event notification and with reference to the first callback address information. Therefore, according to this solution, a target subscription network element can learn of a subscription event in a timely manner in a scenario in which a terminal has migrated from a source subscription network element to the target subscription network element, in order to process the corresponding subscription event in a timely manner.

In a possible design, the first callback address information is address information correlated with the target subscription network element, or the first callback address information is address information correlated with a terminal group to which the first terminal belongs. In other words, the first callback address information in this embodiment of this application may be address information at a granularity of a terminal group, or may be address information at a granularity of a subscription network element. This is not specifically limited in this embodiment of this application.

In a possible design, the first message further carries a first notification correlation identity allocated by the source subscription network element to the first subscription event, and the first notification correlation identity is used to determine the first subscription event.

In a possible design, the subscription update method provided in this embodiment of this application may further include receiving, by the first event notification network element, a second message from the target subscription network element, where the second message carries second callback address information of the target subscription network element and first indication information. The second callback address information is address information correlated with the first subscription event, the first indication information is used to determine the first subscription event, and the second callback address information is used by the first event notification network element to send a second event notification of the first subscription event to the target subscription network element based on the second callback address information. In other words, in this embodiment of this application, in the scenario in which the terminal has migrated from the source subscription network element to the target subscription network element, the first event notification network element may obtain the second callback address information of the target subscription network element corresponding to the first subscription event, namely, address information at a granularity of a subscription event; and may further send the second event notification to the target subscription network element based on the second callback address information. In this way, the target subscription network element can learn an event notification of the first subscription event in a timely manner based on the second event notification and with reference to the second callback address information. Therefore, according to this solution, a target subscription network element can learn an event notification of a subscription event in a timely manner in a scenario in which a terminal has migrated from a source subscription network element to the target subscription network element, in order to process the corresponding subscription event in a timely manner.

In a possible design, the subscription update method provided in this embodiment of this application may further include receiving, by the first event notification network element, a first status notification from the source subscription network element or the target subscription network element, where the first status notification carries the first callback address information of the target subscription network element. Correspondingly, obtaining, by the first event notification network element, the first callback address information of the target subscription network element includes determining, by the first event notification network element, the first callback address information of the target subscription network element based on the first status notification. According to this solution, the first event notification network element can obtain the first callback address information of the target subscription network element.

In a possible design, obtaining, by the first event notification network element, the first callback address information of the target subscription network element includes sending, by the first event notification network element, a fourth message to a network repository function network element, where the fourth message carries second indication information and any one of the following: a first group identifier allocated by the source subscription network element to the terminal group to which the first terminal belongs, a set identifier of a subscription network element set corresponding to the first group identifier, an identifier of the target subscription network element, or an identifier of the target subscription network element and the first group identifier. Additionally, the second indication information is used to indicate that the fourth message is used to request the first callback address information of the target subscription network element, and obtaining the first callback address information of the target subscription network element further includes receiving, by the first event notification network element, the first callback address information of the target subscription network element from the network repository function network element. According to this solution, the first event notification network element can obtain the first callback address information of the target subscription network element.

In a possible design, before sending, by the first event notification network element, a fourth message to a network repository function network element, the subscription update method provided in this embodiment of this application may further include determining, by the first event notification network element, that the source subscription network element no longer serves the first terminal.

In a possible design, the target subscription network element includes a target AMF network element. Correspondingly, the first group identifier is a globally unique AMF identifier (GUAMI) corresponding to the terminal group to which the first terminal belongs.

In a possible design, obtaining, by the first event notification network element, first callback address information of the target subscription network element includes sending, by the first event notification network element, a third event notification of the first subscription event to the source subscription network element based on callback address information of the source subscription network element correlated with the first terminal, and receiving, by the first event notification network element, a rejection message from the source subscription network element, where the rejection message carries the first callback address information of the target subscription network element. According to this solution, the first event notification network element can obtain the first callback address information of the target subscription network element.

According to a second aspect, a subscription update method is provided. The method is applied to a scenario in which a first terminal migrates from a source subscription network element to a target subscription network element. The method includes receiving, by a first event notification network element, a second message from the target subscription network element, where the second message carries second callback address information of the target subscription network element and first indication information. The second callback address information is address information correlated with the first subscription event, the first indication information is used to determine the first subscription event, and the second callback address information is used by the first event notification network element to send a second event notification of the first subscription event to the target subscription network element based on the second callback address information. In this solution, in the scenario in which the terminal has migrated from the source subscription network element to the target subscription network element, the first event notification network element may obtain the second callback address information of the target subscription network element corresponding to the first subscription event, namely, address information at a granularity of a subscription event; and may further send the second event notification to the target subscription network element based on the second callback address information. In this way, the target subscription network element can learn an event notification of the first subscription event in a timely manner based on the second event notification and with reference to the second callback address information. Therefore, according to this solution, a target subscription network element can learn an event notification of a subscription event in a timely manner in a scenario in which a terminal has migrated from a source subscription network element to the target subscription network element, in order to process the corresponding subscription event in a timely manner.

With reference to the first aspect or the second aspect, in a possible design, the second message further carries a second notification correlation identity allocated by the target subscription network element to the first subscription event; and correspondingly, the second callback address information is further used by the first event notification network element to send the second notification correlation identity to the target subscription network element based on the second callback address information.

According to a third aspect, a subscription update method is provided. The method is applied to a scenario in which a first terminal migrates from a source subscription network element to a target subscription network element. The method includes determining, by a first event notification network element, that a notification condition of a first subscription event of the first terminal is met, and sending, by the first event notification network element, a first message to the target subscription network element, where the first message carries an identifier of the first terminal, and is used to request the target subscription network element to update subscription of the first terminal. The method further includes receiving, by the first event notification network element, a second message from the target subscription network element, where the second message carries first indication information and first callback address information, correlated with the first subscription event, of the target subscription network element. The first indication information is used to determine the first subscription event, and the first callback address information is used by the first event notification network element to send a first event notification of the first subscription event to the target subscription network element based on the first callback address information. In this solution, in the scenario in which the first terminal has migrated from the source subscription network element to the target subscription network element, the first event notification network element may obtain the first callback address information, correlated with the first subscription event, of the target subscription network element, and send the first event notification to the target subscription network element based on the first callback address information of the target subscription network element. In this way, the target subscription network element can learn an event notification of the first subscription event in a timely manner based on the first event notification and with reference to the first callback address information. Therefore, according to this solution, a target subscription network element can learn an event notification of a subscription event in a timely manner in a scenario in which a terminal has migrated from a source subscription network element to the target subscription network element, in order to process the corresponding subscription event in a timely manner.

In a possible design, before sending, by the first event notification network element, a first message to the target subscription network element, the subscription update method provided in this embodiment of this application may further include determining, by the first event notification network element, that the source subscription network element no longer serves the first terminal.

In a possible design, before sending, by the first event notification network element, a first message to the target subscription network element, the subscription update method provided in this embodiment of this application may further include obtaining, by the first event notification network element, address information of a first service of the target subscription network element from a network repository function network element, where the first service is used to trigger a subscription update of the first subscription event. Correspondingly, sending, by the first event notification network element, a first message to the target subscription network element includes sending, by the first event notification network element, the first message to the target subscription network element based on the address information of the first service. According to this solution, the subscription update of the first subscription event can be triggered.

In a possible design, obtaining, by the first event notification network element, address information of a first service of the target subscription network element from a network repository function network element includes: sending, by the first event notification network element, a fourth message to the network repository function network element, where the fourth message carries information about the target subscription network element and second indication information, and the second indication information is used to indicate that the fourth message is used to request the address information of the first service of the target subscription network element; and receiving, by the first event notification network element, the address information of the first service from the network repository function network element. According to this solution, the first event notification network element can obtain the address information of the first service of the target subscription network element from the network repository function network element.

According to a fourth aspect, a subscription update method is provided. The method is applied to a scenario in which a first terminal migrates from a source subscription network element to a target subscription network element. The method includes determining, by a first event notification network element, that a notification condition of a first subscription event of the first terminal is met; generating, by the first event notification network element for the first subscription event, corresponding first callback address information of the target subscription network element; and sending, by the first event notification network element, a first event notification of the first subscription event to the target subscription network element based on the first callback address information of the target subscription network element. In this solution, in the scenario in which the first terminal has migrated from the source subscription network element to the target subscription network element, the first event notification network element may generate, for the first subscription event, the corresponding first callback address information of the target subscription network element, and send the first event notification to the target subscription network element based on the first callback address information. In this way, the target subscription network element can learn an event notification of the first subscription event in a timely manner based on the first event notification and with reference to the first callback address information. Therefore, according to this solution, a target subscription network element can learn an event notification of a subscription event in a timely manner in a scenario in which a terminal has migrated from a source subscription network element to the target subscription network element, in order to process the corresponding subscription event in a timely manner.

In a possible design, the subscription update method provided in this embodiment of this application may further include receiving, by the first event notification network element, a subscription request from the source subscription network element, where the subscription request carries first callback address information of the source subscription network element corresponding to the first subscription event, and the first callback address information of the source subscription network element includes information about the source subscription network element. Additionally, generating, by the first event notification network element for the first subscription event, corresponding first callback address information of the target subscription network element includes: generating, by the first event notification network element for the first subscription event, the corresponding first callback address information of the target subscription network element based on the first callback address information of the source subscription network element corresponding to the first subscription event, where the first callback address information of the target subscription network element includes information about the target subscription network element. According to this solution, the first event notification network element can generate, for the first subscription event, the corresponding first callback address information of the target subscription network element.

In a possible design, generating, by the first event notification network element for the first subscription event, the corresponding first callback address information of the target subscription network element based on the first callback address information of the source subscription network element corresponding to the first subscription event includes: substituting, by the first event notification network element, the information about the target subscription network element for the information about the source subscription network element that is in the first callback address information of the source subscription network element corresponding to the first subscription event, to obtain the corresponding first callback address information of the target subscription network element that is generated for the first subscription event.

In a possible design, generating, by the first event notification network element, first callback address information of the target subscription network element corresponding to the first subscription event includes: generating, by the first event notification network element for the first subscription event, the corresponding first callback address information of the target subscription network element based on a preset callback address format, where the first callback address information of the target subscription network element includes the information about the target subscription network element. According to this solution, the first event notification network element can generate, for the first subscription event, the corresponding first callback address information of the target subscription network element.

In a possible design, the preset callback address format or callback address information of the source subscription network element further includes first information, the first information includes at least one of information about the first terminal or information about the first subscription event, the information about the first terminal is used to determine the first terminal corresponding to the first subscription event, and the information about the first subscription event is used to determine the first subscription event; and correspondingly, the first callback address information of the target subscription network element further includes the first information.

In a possible design, before generating, by the first event notification network element for the first subscription event, the corresponding first callback address information of the target subscription network element, the subscription update method provided in this embodiment of this application may further include determining, by the first event notification network element, that the source subscription network element no longer serves the first terminal.

With reference to the first aspect, the third aspect, or the fourth aspect, in a possible design, determining, by the first event notification network element, that the source subscription network element no longer serves the first terminal includes receiving, by the first event notification network element, a second status notification from the source subscription network element or the target subscription network element, where the second status notification is used to notify that the source subscription network element no longer serves the first terminal. According to this solution, the first event notification network element can determine that the source subscription network element no longer serves the first terminal.

With reference to the first aspect, the third aspect, or the fourth aspect, in a possible design, determining, by the first event notification network element, that the source subscription network element no longer serves the first terminal includes: sending, by the first event notification network element, a third event notification of the first subscription event to the source subscription network element based on call address information of the source subscription network element correlated with the first terminal; and determining, by the first event notification network element, that the source subscription network element is inaccessible. According to this solution, the first event notification network element can determine that the source subscription network element no longer serves the first terminal.

According to a fifth aspect, a subscription update method is provided. The method is applied to a scenario in which a first terminal migrates from a source subscription network element to a target subscription network element. The method includes receiving, by the target subscription network element, a first message from a first event notification network element, where the first message carries an identifier of the first terminal, and is used to request the target subscription network element to update subscription of the first terminal. The method further includes sending, by the target subscription network element, a second message to the first event notification network element based on the first message, where the second message carries first indication information and first callback address information, correlated with the first subscription event, of the target subscription network element, the first indication information is used to determine the first subscription event, and the first callback address information is used by the first event notification network element to send a first event notification of the first subscription event to the target subscription network element based on the first callback address information. For technical effects of the fifth aspect, refer to the technical effect of the third aspect. Details are not described herein again.

In a possible design, the subscription update method provided in this embodiment of this application may further include sending, by the target subscription network element, a fifth message to a second event notification network element, where the fifth message carries third indication information and third callback address information, correlated with a second subscription event of the first terminal, of the target subscription network element, the third indication information is used to determine the second subscription event, and the third callback address is used by the second event notification network element to send a fourth event notification of the second subscription event to the target subscription network element based on the third callback address information. In other words, in this embodiment of this application, in the scenario in which the first terminal has migrated from the source subscription network element to the target subscription network element, satisfying the notification condition of the first subscription event may also trigger the target subscription network element to send, to a corresponding event notification network element, callback address information, correlated with a remaining subscription event other than the first subscription event of the first terminal, of the target subscription network element. In this way, after a notification condition of the subscription event is subsequently met, the corresponding event notification network element may directly send a corresponding event notification to the target subscription network element based on the callback address information, correlated with the subscription event, of the target subscription network element. This avoids a problem that a target subscription network element currently serving a terminal cannot learn an event notification of a subscription event in a timely manner, and therefore cannot process the corresponding subscription event in a timely manner.

In a possible design, the subscription update method provided in this embodiment of this application may further include receiving, by the target subscription network element, callback address information of the first event notification network element from the source subscription network element, where the callback address information of the first event notification network element is used to receive a status change notification of a terminal group to which the first terminal belongs; and sending, by the target subscription network element, the status change notification to the first event notification network element based on the callback address information of the first event notification network element, where the status change notification is used to notify that the source subscription network element no longer serves a terminal in the terminal group to which the first terminal belongs. According to this solution, the first event notification network element can determine that the source subscription network element no longer serves the terminal in the terminal group to which the first terminal belongs.

In a possible design, the subscription update method provided in this embodiment of this application may further include sending, by the target subscription network element, a seventh message to a network repository function network element, where the seventh message carries information about the target subscription network element and address information of a first service of the target subscription network element; and storing, by the network repository function network element, the information about the target subscription network element and the address information of the first service of the target subscription network element, where the first service is used to trigger the target subscription network element to perform a subscription update.

With reference to the third aspect or the fifth aspect, in a possible design, the first message further carries at least one of a subscription correlation identity allocated by the first event notification network element to the first subscription event or a first notification correlation identity allocated by the source subscription network element to the first subscription event, and the at least one of the subscription correlation identity or the first notification correlation identity is used to determine the first subscription event.

With reference to the third aspect or the fifth aspect, in a possible design, the second message further carries a second notification correlation identity allocated by the target subscription network element to the first subscription event; and correspondingly, the first callback address information is further used by the first event notification network element to send the second notification correlation identity to the target subscription network element based on the first callback address information.

With reference to the first aspect, the second aspect, the third aspect, or the fifth aspect, in a possible design, the first indication information includes at least one of a subscription correlation identity allocated by the first event notification network element to the first subscription event or an identifier of the first terminal.

According to a sixth aspect, a first event notification network element is provided. The first event notification network element has a function of implementing the method according to any one of the first aspect to the fourth aspect. The function may be implemented by hardware, or may be implemented by hardware by executing corresponding software. The hardware or software includes one or more modules corresponding to the function.

According to a seventh aspect, a first event notification network element is provided, including a processor and a memory. The memory is configured to store a computer executable instruction. When the first event notification network element runs, the processor executes the computer executable instruction stored in the memory, such that the first event notification network element performs the subscription update method according to any one of the first aspect to the fourth aspect.

According to an eighth aspect, a first event notification network element is provided, including a processor. The processor is configured such that after being coupled with a memory and reading an instruction in the memory, the processor performs, according to the instruction, the subscription update method according to any one of the first aspect to the fourth aspect.

According to a ninth aspect, a computer readable storage medium is provided. The computer readable storage medium stores an instruction, and when the instruction runs on a computer, the computer can be enabled to perform the subscription update method according to any one of the first aspect to the fourth aspect.

According to a tenth aspect, a computer program product including an instruction is provided. When the computer program product runs on a computer, the computer can be enabled to perform the subscription update method according to any one of the first aspect to the fourth aspect.

According to an eleventh aspect, a chip system is provided. The chip system includes a processor, configured to support a first event notification network element in implementing the function included in any one of the first aspect to the fourth aspect, for example, determining that a notification condition of a first subscription event of a first terminal is met. In a possible design, the chip system further includes a memory. The memory is configured to store a program instruction and data that are required for the first event notification network element. The chip system may include a chip, or may include a chip and another discrete device.

According to a twelfth aspect, a target subscription network element is provided. The target subscription network element has a function of implementing the method according to the fifth aspect. The function may be implemented by hardware, or may be implemented by hardware by executing corresponding software. The hardware or software includes one or more modules corresponding to the function.

According to a thirteenth aspect, a target subscription network element is provided, including a processor and a memory. The memory is configured to store a computer executable instruction. When the target subscription network element runs, the processor executes the computer executable instruction stored in the memory, such that the target subscription network element performs the subscription update method according to the fifth aspect.

According to a fourteenth aspect, a target subscription network element is provided, including a processor. The processor is configured such that after being coupled with a memory and reading an instruction in the memory, the processor performs, according to the instruction, the subscription update method according to the fifth aspect.

According to a fifteenth aspect, a computer readable storage medium is provided. The computer readable storage medium stores an instruction. When the instruction runs on a computer, the computer can be enabled to perform the subscription update method according to the fifth aspect.

According to a sixteenth aspect, a computer program product including an instruction is provided. When the computer program product runs on a computer, the computer can be enabled to perform the subscription update method according to the fifth aspect.

According to a seventeenth aspect, a chip system is provided. The chip system includes a processor, configured to support a target subscription network element in implementing the function included in the fifth aspect, for example, obtaining first callback address information of the target subscription network element. In a possible design, the chip system further includes a memory. The memory is configured to store a program instruction and data that are required for the target subscription network element. The chip system may include a chip, or may include a chip and another discrete device.

According to an eighteenth aspect, a subscription update system is provided, and is applied to a scenario in which a first terminal migrates from a source subscription network element to a target subscription network element. The subscription update system includes a first event notification network element and the target subscription network element. The first event notification network element is configured to determine that a notification condition of a first subscription event of the first terminal is met. The first event notification network element is further configured to obtain first callback address information of the target subscription network element. The first event notification network element is further configured to send a first message to the target subscription network element based on the first callback address information, where the first message carries an identifier of the first terminal and a first event notification of the first subscription event, and the identifier of the first terminal is used to correlate the first event notification with the first terminal. The target subscription network element is configured to receive the first message from the first event notification network element.

In a possible design, the target subscription network element is further configured to send a second message to the first event notification network element, where the second message carries second callback address information of the target subscription network element and first indication information, the second callback address information is address information correlated with the first subscription event, the first indication information is used to determine the first subscription event, and the second callback address information is used by the first event notification network element to send a second event notification of the first subscription event to the target subscription network element based on the second callback address information. The first event notification network element is further configured to receive the second message from the target subscription network element.

In a possible design, the subscription update system further includes the source subscription network element. The first event notification network element is configured to send a subscription request to the source subscription network element, where the subscription request carries callback address information of the first event notification network element, and is used to subscribe to a status change event of a terminal group to which the first terminal belongs. The source subscription network element is configured such that after determining no longer to serve a terminal in the terminal group to which the first terminal belongs, the source subscription network element sends a first status notification to the first event notification network element based on the callback address information of the first event notification network element, where the first status notification carries the first callback address information of the target subscription network element. The first event notification network element is further configured to receive the first status notification from the source subscription network element. Correspondingly, that the first event notification network element is further configured to obtain first callback address information of the target subscription network element is such that the first event notification network element is further configured to determine the first callback address information of the target subscription network element based on the first status notification.

In a possible design, the subscription update system further includes the source subscription network element. The first event notification network element is configured to send a subscription request to the source subscription network element, where the subscription request carries callback address information of the first event notification network element, and is used to subscribe to a status change event of a terminal group to which the first terminal belongs. The source subscription network element is configured such that after determining no longer to serve a terminal in the terminal group to which the first terminal belongs, source subscription network element sends callback address information of the first event notification network element to the target subscription network element, where the callback address information of the first event notification network element is used to receive a status change notification of the terminal group to which the first terminal belongs. The target subscription network element is further configured to receive the callback address information of the first event notification network element from the source subscription network element, and send a first status notification to the first event notification network element based on the callback address information of the first event notification network element, where the first status notification carries the first callback address information of the target subscription network element. The first event notification network element is further configured to receive the first status notification from the target subscription network element. Correspondingly, that the first event notification network element is further configured to obtain first callback address information of the target subscription network element includes the first event notification network element being further configured to determine the first callback address information of the target subscription network element based on the first status notification.

In a possible design, the subscription update system further includes a network repository function network element. That the first event notification network element is further configured to obtain first callback address information of the target subscription network element includes the first event notification network element being further configured to: send a fourth message to the network repository function network element, where the fourth message carries second indication information and any one of the following: a first group identifier allocated by the source subscription network element to the terminal group to which the first terminal belongs, a set identifier of a subscription network element set corresponding to the first group identifier, an identifier of the target subscription network element, or an identifier of the target subscription network element and the first group identifier, and the second indication information is used to indicate that the fourth message is used to request the first callback address information of the target subscription network element; and receive the first callback address information of the target subscription network element from the network repository function network element. The network repository function network element is configured to receive the fourth message from the first event notification network element, and send the first callback address information of the target subscription network element to the first event notification network element after determining the first callback address information of the target subscription network element based on the fourth message.

In a possible design, the target subscription network element is further configured to send a seventh message to the network repository function network element, where the seventh message carries the first group identifier allocated by the source subscription network element to the terminal group to which the first terminal belongs or the identifier of the target subscription network element, and the corresponding first callback address information of the target subscription network element. The network repository function network element is further configured to receive the seventh message from the target subscription network element, and store the first group identifier or the identifier of the target subscription network element, and the corresponding first callback address information of the target subscription network element.

In a possible design, the subscription update system further includes the source subscription network element. That the first event notification network element is further configured to obtain first callback address information of the target subscription network element includes the first event notification network element being further configured to send a third event notification of the first subscription event to the source subscription network element based on callback address information of the source subscription network element correlated with the first terminal, and receive a rejection message from the source subscription network element, where the rejection message carries the first callback address information of the target subscription network element. The source subscription network element is configured to receive the third event notification from the first event notification network element, and send the rejection message to the first event notification network element.

According to a nineteenth aspect, a subscription update system is provided, and is applied to a scenario in which a first terminal migrates from a source subscription network element to a target subscription network element. The subscription update system includes a first event notification network element and the target subscription network element. The first event notification network element is configured to determine that a notification condition of a first subscription event of the first terminal is met. The first event notification network element is further configured to send a first message to the target subscription network element, where the first message carries an identifier of the first terminal, and is used to request the target subscription network element to update subscription of the first terminal. The target subscription network element is configured to receive the first message from the first event notification network element, and send a second message to the first event notification network element based on the first message, where the second message carries first indication information and first callback address information, correlated with the first subscription event, of the target subscription network element, the first indication information is used to determine the first subscription event, and the first callback address information is used by the first event notification network element to send a first event notification of the first subscription event to the target subscription network element based on the first callback address information. The first event notification network element is further configured to receive the second message from the target subscription network element.

In a possible design, the subscription update system further includes a second event notification network element. The target subscription network element is further configured to send a fifth message to the second event notification network element, where the fifth message carries third indication information and second callback address information, correlated with a second subscription event of the first terminal, of the target subscription network element, the third indication information is used to determine the second subscription event, and the second callback address is used by the second event notification network element to send a fourth event notification of the second subscription event to the target subscription network element based on the second callback address information. The second event notification network element is further configured to receive the fifth message from the target subscription network element.

In a possible design, the subscription update system further includes a network repository function network element. The first event notification network element is further configured to obtain address information of a first service of the target subscription network element from the network repository function network element, where the first service is used to trigger the target subscription network element to initiate a subscription update. Correspondingly, that the first event notification network element is further configured to send a first message to the target subscription network element includes the first event notification network element being further configured to send the first message to the target subscription network element based on the address information of the first service.

In a possible design, that the first event notification network element is further configured to obtain address information of a first service of the target subscription network element from the network repository function network element includes the first event notification network element being further configured to: send a fourth message to the network repository function network element, where the fourth message carries information about the target subscription network element and second indication information, and the second indication information is used to indicate that the fourth message is used to request the address information of the first service of the target subscription network element; and receive the address information of the first service from the network repository function network element. The network repository function network element is configured to receive the fourth message from the first event notification network element, and send the address information of the first service to the first event notification network element after determining the address information of the first service based on the fourth message.

In a possible design, the target subscription network element is further configured to send a seventh message to the network repository function network element, where the seventh message carries the information about the target subscription network element and the address information of the first service of the target subscription network element, and the first service is used to trigger the target subscription network element to initiate a subscription update. The network repository function network element is further configured to receive the seventh message from the target subscription network element, and store the information about the target subscription network element and the address information of the first service of the target subscription network element.

With reference to the eighteenth aspect or the nineteenth aspect, in a possible design, the subscription update system further includes a second event notification network element. The target subscription network element is further configured to send a fifth message to the second event notification network element, where the fifth message carries third callback address information of the target subscription network element and third indication information, the third callback address information is address information correlated with a second subscription event of the first terminal, the third indication information is used to determine the second subscription event, and the third callback address information is used by the second event notification network element to send a fourth event notification of the second subscription event to the target subscription network element based on the third callback address information. The second event notification network element is further configured to receive the fifth message from the target subscription network element.

With reference to the eighteenth aspect or the nineteenth aspect, in a possible design, the subscription update system further includes the source subscription network element and an unstructured data storage function network element. The source subscription network element is configured such that after determining no longer to serve a terminal in a terminal group to which the first terminal belongs, the source subscription network element sends, to the unstructured data storage function network element, a context of the terminal in the terminal group to which the first terminal belongs, where the context of the terminal in the terminal group to which the first terminal belongs includes a context of the first terminal, the context of the first terminal includes information about the first subscription event, and the information about the first subscription event includes the first indication information. The unstructured data storage function network element is configured to receive, from the source subscription network element, and store the context of the terminal in the terminal group to which the first terminal belongs. The target subscription network element is further configured to obtain the context of the first terminal from the unstructured data storage function network element.

With reference to the eighteenth aspect or the nineteenth aspect, in a possible design, the subscription update system further includes the source subscription network element. The source subscription network element is configured such that after determining no longer to serve a terminal in a terminal group to which the first terminal belongs, the source subscription network element sends, to the target subscription network element, a context of the terminal in the terminal group to which the first terminal belongs, where the context of the terminal in the terminal group to which the first terminal belongs includes a context of the first terminal, the context of the first terminal includes information about the first subscription event, and the information about the first subscription event includes the first indication information. The target subscription network element is configured to receive, from the source subscription network element, and store the context of the terminal in the terminal group to which the first terminal belongs.

For technical effects of any design manner in the eighteenth aspect or the nineteenth aspect, refer to the technical effects of different design manners in the first aspect, the second aspect, the third aspect, or the fifth aspect. Details are not described herein again.

According to a twentieth aspect, a subscription update system is provided, and is applied to a scenario in which a first terminal migrates from a source subscription network element to a target subscription network element. The subscription update system includes a first event notification network element and the target subscription network element. The first event notification network element is configured to determine that a notification condition of a first subscription event of the first terminal is met. The first event notification network element is configured to generate, for the first subscription event, corresponding first callback address information of the target subscription network element, and send a first event notification of the first subscription event to the target subscription network element based on the first callback address information. The target subscription network element is configured to receive the first event notification from the first event notification network element.

In a possible design, the subscription update system provided in this embodiment of this application may further include the source subscription network element. The source subscription network element is configured to send a subscription request to a first event notification network element, where the subscription request carries first callback address information of the source subscription network element corresponding to the first subscription event, and the first callback address information of the source subscription network element includes information about the source subscription network element. The first event notification network element is configured to receive the subscription request from the source subscription network element. Correspondingly, that the first event notification network element is configured to generate, for the first subscription event, corresponding first callback address information of the target subscription network element includes the first event notification network element being configured to generate, for the first subscription event, the corresponding first callback address information of the target subscription network element based on the first callback address information, carried in the subscription request, of the source subscription network element corresponding to the first subscription event, where the first callback address information of the target subscription network element includes information about the target subscription network element.

For technical effects of any design manner in the twentieth aspect, refer to the technical effects of different design manners in the fourth aspect. Details are not described herein again.

DESCRIPTION OF EMBODIMENTS

The following describes technical solutions in embodiments of this application with reference to accompanying drawings in the embodiments of this application. In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two unless otherwise specified. In addition, to clearly describe the technical solutions in the embodiments of this application, terms, such as "first" and "second", are used in the embodiments of this application to distinguish between same items or similar items that have a basically same function and usage. A person skilled in the art may understand that the terms, such as "first" and "second", are not intended to limit a quantity or an execution sequence; and the terms, such as "first" and "second", do not indicate a definite difference.

In addition, network architectures and service scenarios described in the embodiments of this application aim to more clearly describe the technical solutions in the embodiments of this application, but are not intended to limit the technical solutions provided in the embodiments of this application. A person of ordinary skill in the art may know that as the network architectures evolve and a new service scenario emerges, the technical solutions provided in the embodiments of this application are also applicable to a similar technical problem.

Figure 1:
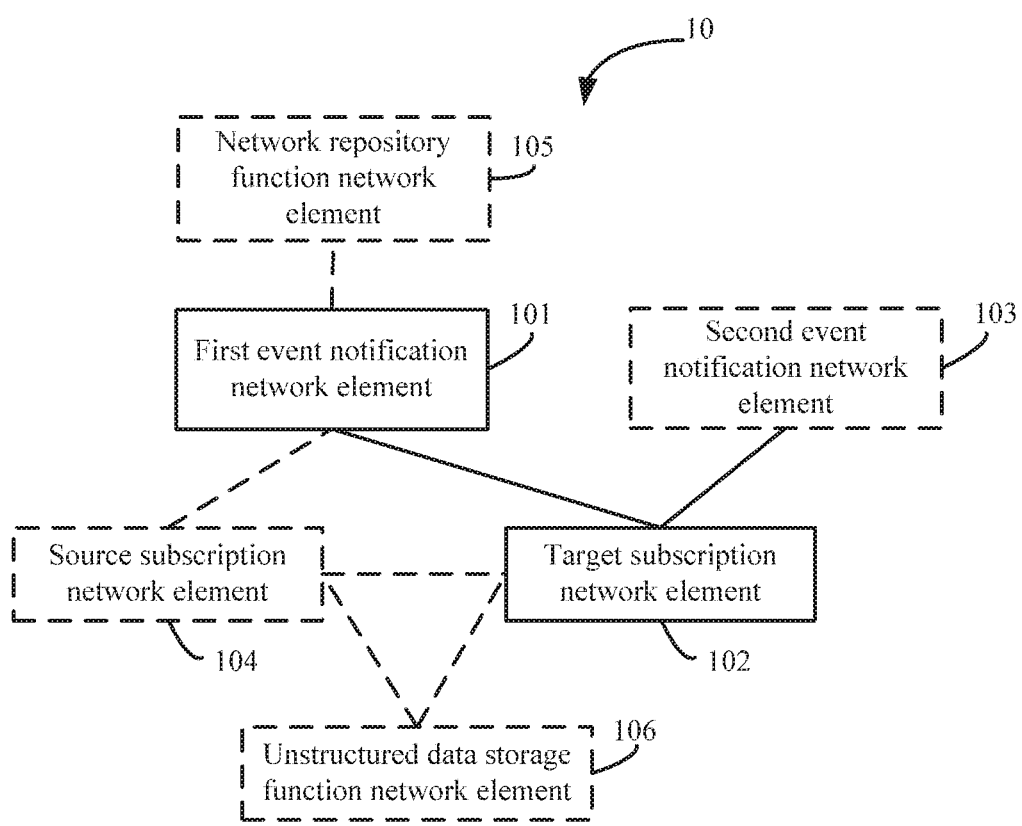
FIG. 1 is a schematic structural diagram of a subscription update system according to an embodiment of this application.

FIG. 1 shows a subscription update system 10 according to an embodiment of this application. The subscription update system 10 includes a first event notification network element 101 and a target subscription network element 102, and may be applied to a scenario in which a first terminal has migrated from a source subscription network element to the target subscription network element 102.

The following possible solutions may be provided based on the subscription update system shown in FIG. 1.

Solution 1

The first event notification network element 101 is configured to: determine that a notification condition of a first subscription event of the first terminal is met; obtain first callback address information of the target subscription network element 102; and send a first message to the target subscription network element based on the first callback address information, where the first message carries an identifier of the first terminal and a first event notification of the first subscription event, and the identifier of the first terminal is used to correlate the first event notification with the first terminal.

The target subscription network element 102 is configured to receive the first message from the first event notification network element 101.

Optionally, the first callback address information in this embodiment of this application may be address information correlated with a terminal group to which the first terminal belongs, namely, address information at a granularity of a terminal group; the first callback address information in this embodiment of this application may be address information correlated with the target subscription network element, namely, address information at a granularity of a target subscription network element. This is not specifically limited in this embodiment of this application.

According to the subscription update system provided in this embodiment of this application, in the scenario in which the first terminal has migrated from the source subscription network element to the target subscription network element, the first event notification network element may obtain the first callback address information of the target subscription network element, and send the first event notification and the identifier of the first terminal to the target subscription network element based on the first callback address information of the target subscription network element, where the identifier of the first terminal is used to correlate the first event notification with the first terminal. In this way, the target subscription network element can learn an event notification of the first subscription event in a timely manner based on the identifier of the first terminal and the first event notification and with reference to the first callback address information. Therefore, according to the subscription update system in this embodiment of this application, a target subscription network element can learn an event notification of a subscription event in a timely manner in a scenario in which a terminal has migrated from a source subscription network element to the target subscription network element, in order to process the corresponding subscription event in a timely manner.

Optionally, according to the foregoing Solution 1, in this embodiment of this application, the target subscription network element 102 is further configured to send a second message to the first event notification network element 101, where the second message carries first indication information and second callback address information, correlated with the first subscription event of the first terminal, of the target subscription network element, the first indication information is used to determine the first subscription event, and the second callback address information is used by the first event notification network element to send a second event notification of the first subscription event to the target subscription network element based on the second callback address information.

In other words, in this embodiment of this application, in the scenario in which the terminal has migrated from the source subscription network element to the target subscription network element, the first event notification network element may obtain the second callback address information of the target subscription network element corresponding to the first subscription event, namely, address information at a granularity of a subscription event; and may further send the second event notification to the target subscription network element based on the second callback address information. In this way, the target subscription network element can learn an event notification of the first subscription event in a timely manner based on the second event notification and with reference to the second callback address information. Therefore, according to the subscription update system in this embodiment of this application, a target subscription network element can learn an event notification of a subscription event in a timely manner in a scenario in which a terminal has migrated from a source subscription network element to the target subscription network element, in order to process the corresponding subscription event in a timely manner.

Optionally, according to the foregoing Solution 1, in an implementation, as shown in FIG. 1, the subscription update system 10 provided in this embodiment of this application may further include the source subscription network element 104.

In a possible implementation, the first event notification network element 101 is configured to send a subscription request to the source subscription network element 104, where the subscription request carries callback address information of the first event notification network element, and is used to subscribe to a status change event of the terminal group to which the first terminal belongs.

The source subscription network element 104 is configured such that after determining no longer to serve a terminal in the terminal group to which the first terminal belongs, the source subscription network element 104 sends a first status notification to the first event notification network element based on the callback address information of the first event notification network element 101, where the first status notification carries the first callback address information of the target subscription network element 102.

The first event notification network element 101 is further configured to receive the first status notification from the source subscription network element 104.

Correspondingly, that the first event notification network element 101 is further configured to obtain first callback address information of the target subscription network element 102 includes the first event notification network element 101 being further configured to determine the first callback address information of the target subscription network element 102 based on the first status notification.

Alternatively, in another possible implementation, the first event notification network element 101 is configured to send a subscription request to the source subscription network element 104, where the subscription request carries callback address information of the first event notification network element, and is used to subscribe to a status change event of the terminal group to which the first terminal belongs.

The source subscription network element 104 is configured such that after determining no longer to serve a terminal in the terminal group to which the first terminal belongs, the source subscription network element 104 sends callback address information of the first event notification network element to the target subscription network element 102, where the callback address information of the first event notification network element is used to receive a status change notification of the terminal group to which the first terminal belongs.

The target subscription network element 102 is further configured to receive the callback address information of the first event notification network element 101 from the source subscription network element 104, and send a first status notification to the first event notification network element 101 based on the callback address information of the first event notification network element, where the first status notification carries the first callback address information of the target subscription network element 102.

The first event notification network element 101 is further configured to receive the first status notification from the target subscription network element 102.

Correspondingly, that the first event notification network element 101 is further configured to obtain first callback address information of the target subscription network element includes the first event notification network element 101 being further configured to determine the first callback address information of the target subscription network element based on the first status notification.

Alternatively, in still another possible implementation, that the first event notification network element 101 is further configured to obtain first callback address information of the target subscription network element 102 includes the first event notification network element 101 being further configured to: send a third event notification of the first subscription event to the source subscription network element 104 based on callback address information of the source subscription network element 104 correlated with the first terminal; and receive a rejection message from the source subscription network element 104, where the rejection message carries the first callback address information of the target subscription network element 102.

The source subscription network element 104 is configured to receive the third event notification from the first event notification network element 101, and send the rejection message to the first event notification network element 101.

Optionally, according to the foregoing Solution 1, in another implementation, as shown in FIG. 1, the subscription update system provided in this embodiment of this application further includes a network repository function network element 105.

That the first event notification network element 101 is further configured to obtain first callback address information of the target subscription network element 102 includes the first event notification network element 101 being further configured to: send a fourth message to the network repository function network element 105, where the fourth message carries second indication information and any one of the following: a first group identifier allocated by the source subscription network element to the terminal group to which the first terminal belongs, a set identifier of a subscription network element set corresponding to the first group identifier, an identifier of the target subscription network element 102, or an identifier of the target subscription network element 102 and the first group identifier, and the second indication information is used to indicate that the fourth message is used to request the first callback address information of the target subscription network element 102; and receive the first callback address information of the target subscription network element 102 from the network repository function network element 105.

The network repository function network element 105 is configured to receive the fourth message from the first event notification network element 101, and send the first callback address information of the target subscription network element to the first event notification network element 101 after determining the first callback address information of the target subscription network element based on the fourth message.

Solution 2

The first event notification network element 101 is configured to: determine that a notification condition of a first subscription event of the first terminal is met; and send a first message to the target subscription network element 102, where the first message carries an identifier of the first terminal, and is used to request the target subscription network element 102 to update subscription of the first terminal.

The target subscription network element 102 is configured to receive the first message from the first event notification network element 101, and send a second message to the first event notification network element 101 based on the first message, where the second message carries first indication information and first callback address information, correlated with the first subscription event, of the target subscription network element 102, the first indication information is used to determine the first subscription event, and the first callback address information is used by the first event notification network element 101 to send a first event notification of the first subscription event to the target subscription network element 102 based on the first callback address information.

The first event notification network element 101 is further configured to receive the second message from the target subscription network element.

According to the subscription update system provided in this embodiment of this application, in the scenario in which the first terminal has migrated from the source subscription network element to the target subscription network element, the first event notification network element may obtain the first callback address information, correlated with the first subscription event, of the target subscription network element, and send the first event notification to the target subscription network element based on the first callback address information of the target subscription network element. In this way, the target subscription network element can learn an event notification of the first subscription event in a timely manner based on the first event notification and with reference to the first callback address information. Therefore, according to the subscription update system in this embodiment of this application, a target subscription network element can learn an event notification of a subscription event in a timely manner in a scenario in which a terminal has migrated from a source subscription network element to the target subscription network element, in order to process the corresponding subscription event in a timely manner.

Optionally, according to the foregoing Solution 2, as shown in FIG. 1, the subscription update system 10 provided in this embodiment of this application further includes a network repository function network element 105.

The first event notification network element 101 is further configured to obtain address information of a first service of the target subscription network element 102 from the network repository function network element 105, where the first service is used to trigger the target subscription network element 102 to initiate a subscription update.

Correspondingly, that the first event notification network element 101 is further configured to send a first message to the target subscription network element 102 includes the first event notification network element 101 being further configured to send the first message to the target subscription network element 102 based on the address information of the first service.

Optionally, according to the foregoing Solution 1 or Solution 2, as shown in FIG. 1, the subscription update system 10 in this embodiment of this application may further include a second event notification network element 103.

The target subscription network element 102 is further configured to send a fifth message to the second event notification network element 103, where the fifth message carries third indication information and third callback address information, correlated with a second subscription event of the first terminal, of the target subscription network element, the third indication information is used to determine the second subscription event, and the third callback address is used by the second event notification network element 103 to send a fourth event notification of the second subscription event to the target subscription network element 102 based on the third callback address information.

The second event notification network element 103 is configured to receive the fifth message from the target subscription network element 102.

In other words, in this embodiment of this application, in the scenario in which the first terminal has migrated from the source subscription network element to the target subscription network element, satisfying the notification condition of the first subscription event may also trigger the target subscription network element to send, to a corresponding event notification network element, callback address information, correlated with a remaining subscription event other than the first subscription event of the first terminal, of the target subscription network element. In this way, after a notification condition of the subscription event is subsequently met, the corresponding event notification network element may directly send a corresponding event notification to the target subscription network element based on the callback address information, correlated with the subscription event, of the target subscription network element. This avoids a problem that a target subscription network element currently serving a terminal cannot learn an event notification of a subscription event in a timely manner, and therefore cannot process the corresponding subscription event in a timely manner.

Optionally, according to the foregoing Solution 1 or Solution 2, in an implementation, as shown in FIG. 1, the subscription update system provided in this embodiment of this application may further include the source subscription network element 104 and an unstructured data storage function network element 106.

The source subscription network element 104 is configured such that after determining no longer to serve a terminal in a terminal group to which the first terminal belongs, the source subscription network element 104 sends, to the unstructured data storage function network element 106, a context of the terminal in the terminal group to which the first terminal belongs, where the context of the terminal in the terminal group to which the first terminal belongs includes a context of the first terminal, the context of the first terminal includes information about the first subscription event, and the information about the first subscription event includes the first indication information.

The unstructured data storage function network element 106 is configured to receive, from the source subscription network element 104, and store the context of the terminal in the terminal group to which the first terminal belongs.

The target subscription network element 102 is further configured to obtain the context of the first terminal from the unstructured data storage function network element 106.

Optionally, according to the foregoing Solution 1 or Solution 2, in another implementation, as shown in FIG. 1, the subscription update system provided in this embodiment of this application may further include the source subscription network element 104.

The source subscription network element 104 is configured such that after determining no longer to serve a terminal in a terminal group to which the first terminal belongs, the source subscription network element 104 sends, to the target subscription network element, a context of the terminal in the terminal group to which the first terminal belongs, where the context of the terminal in the terminal group to which the first terminal belongs includes a context of the first terminal, the context of the first terminal includes information about the first subscription event, and the information about the first subscription event includes the first indication information.

The target subscription network element 102 is configured to receive, from the source subscription network element, and store the context of the terminal in the terminal group to which the first terminal belongs.

According to the foregoing solution, the target subscription network element can obtain the first indication information.

Solution 3

The first event notification network element 101 is configured to: determine that a notification condition of a first subscription event of the first terminal is met; generate, for the first subscription event, corresponding first callback address information of the target subscription network element 102; and send a first event notification of the first subscription event to the target subscription network element 102 based on the first callback address information.

The target subscription network element 102 is further configured to receive the first event notification from the first event notification network element 101.

According to the subscription update system provided in this embodiment of this application, in the scenario in which the first terminal has migrated from the source subscription network element to the target subscription network element, the first event notification network element may generate, for the first subscription event, the corresponding first callback address information of the target subscription network element, and send the first event notification to the target subscription network element based on the first callback address information. In this way, the target subscription network element can learn an event notification of the first subscription event in a timely manner based on the first event notification and with reference to the first callback address information. Therefore, according to the subscription update system in this embodiment of this application, a target subscription network element can learn an event notification of a subscription event in a timely manner in a scenario in which a terminal has migrated from a source subscription network element to the target subscription network element, in order to process the corresponding subscription event in a timely manner.

Optionally, according to the foregoing Solution 3, as shown in FIG. 1, the subscription update system 10 provided in this embodiment of this application may further include the source subscription network element 104.

The source subscription network element 104 is configured to send a subscription request to a first event notification network element 101, where the subscription request carries first callback address information of the source subscription network element 104 corresponding to the first subscription event, and the first callback address information of the source subscription network element 104 includes information about the source subscription network element.

The first event notification network element 101 is configured to receive the subscription request from the source subscription network element 104.

Correspondingly, that the first event notification network element 101 is configured to generate, for the first subscription event, corresponding first callback address information of the target subscription network element includes the first event notification network element 101 being configured to generate, for the first subscription event, the corresponding first callback address information of the target subscription network element 102 based on the first callback address information, carried in the subscription request, of the source subscription network element 104 corresponding to the first subscription event, where the first callback address information of the target subscription network element 102 includes information about the target subscription network element 102.

According to the foregoing solution, the first event notification network element can generate, for the first subscription event, the corresponding first callback address information of the target subscription network element.

Optionally, the first event notification network element 101, the source subscription network element 104, and the target subscription network element 102 in FIG. 1 may directly communicate with each other, or may communicate with each other through forwarding by another device. This is not specifically limited in this embodiment of this application.

Optionally, two of the unstructured data storage function network element 106, the target subscription network element 102, and the source subscription network element 104 in FIG. 1 may directly communicate with each other, or may communicate with each other through forwarding by another device. This is not specifically limited in this embodiment of this application.

Optionally, the target subscription network element 102 and the second event notification network element 103 in FIG. 1 may directly communicate with each other, or may communicate with each other through forwarding by another device. This is not specifically limited in this embodiment of this application.

Optionally, the first event notification network element 101 and the network repository function network element 105 in FIG. 1 may directly communicate with each other, or may communicate with each other through forwarding by another device. This is not specifically limited in this embodiment of this application.

Optionally, the subscription update system 10 shown in FIG. 1 may be applied to a current 5th Generation (5G) network and another future network. This is not specifically limited in this embodiment of the present disclosure.

Figure 2:
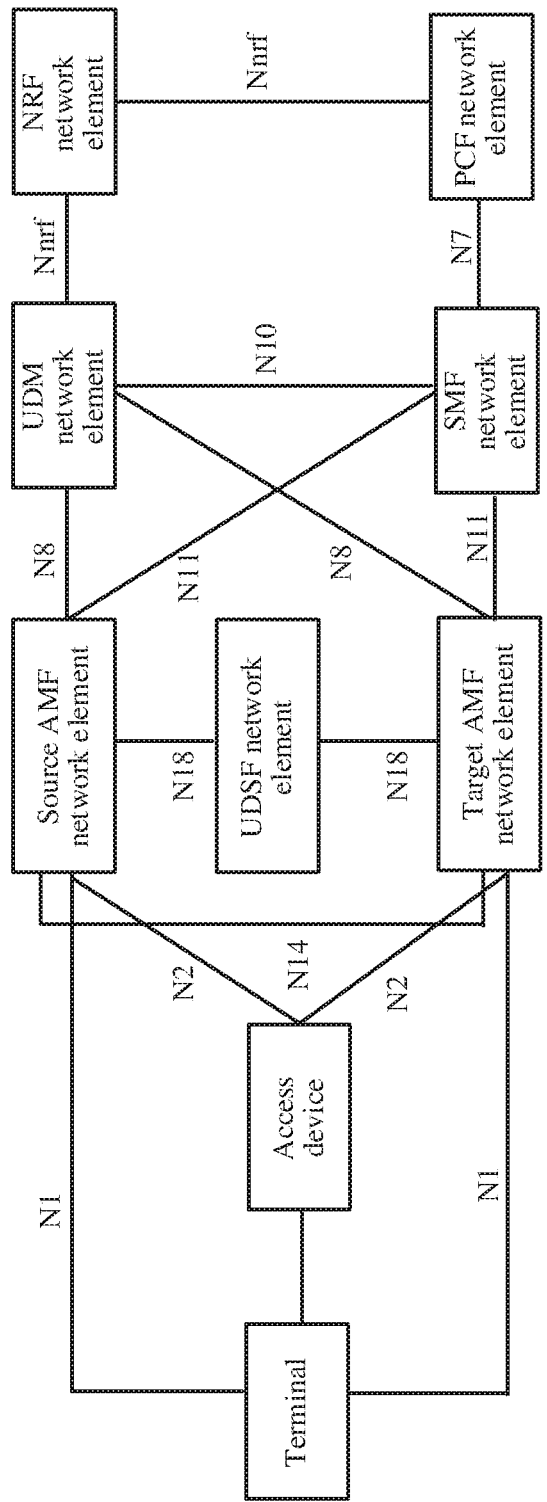
FIG. 2 is a schematic application diagram of a subscription update system in a 5G network according to an embodiment of this application.

For example, assuming that the subscription update system 10 shown in FIG. 1 may be applied to the current 5G network, as shown in FIG. 2, a network element or an entity corresponding to the foregoing source subscription network element may be a source AMF network element in the 5G network; a network element or an entity corresponding to the foregoing target subscription network element may be a target AMF network element in the 5G network; a network element or an entity corresponding to the foregoing first event notification network element or second event notification network element may be an SMF network element, a UDM network element, or a PCF network element in the 5G network; a network element or an entity corresponding to the foregoing network repository function network element may be a network function repository function (NRF) network element in the 5G network; and a network element or an entity corresponding to the foregoing unstructured data storage function network element may be an unstructured data storage function (UDSF) network element in the 5G network.

In addition, although not shown, the 5G network may further include an authentication server function (AUSF) network element, a user plane function (UPF) network element, or the like. This is not specifically limited in this embodiment of this application.

As shown in FIG. 2, in this embodiment of this application, a terminal accesses a 5G core network through an access device. The terminal communicates with each of the source AMF network element and the target AMF network element through a next-generation network (Next generation, N) 1 interface (N1 for short). The access device communicates with each of the source AMF network element and the target AMF network element through an N2 interface (N2 for short). The source AMF network element and the target AMF network element each communicate with the SMF network element through an N11 interface (N11 for short). The source AMF network element and the target AMF network element each communicate with the UDM network element through an N8 interface (N8 for short). The source AMF network element and the target AMF network element each communicate with the UDSF network element through an N18 interface (N18 for short). The source AMF network element communicates with the target AMF network element through an N14 interface (N14 for short). The SMF network element communicates with the PCF network element through an N7 interface (N7 for short). The PCF network element communicates with the NRF network element through an Nnrf service-based interface (Nnrf for short). The UDM network element communicates with the NRF network element through an Nnrf service-based interface (Nnrf for short).

It should be noted that the names of the interfaces between the network elements in FIG. 2 are merely examples, and the interface names may be other names in specific implementation. This is not specifically limited in this embodiment of this application.

It should be noted that the terminal, the access device, the source AMF network element, the target AMF network element, the SMF network element, the UDM network element, the PCF network element, the NRF network element, or the UDSF network element in FIG. 2 is merely a name, and the name constitutes no limitation on the device. In the 5G network and/or other future network, a network element or an entity corresponding to the terminal, the access device, the source AMF network element, the target AMF network element, the SMF network element, the UDM network element, the PCF network element, the NRF network element, or the UDSF network element may alternatively have another name. This is not specifically limited in this embodiment of this application.

Optionally, in the foregoing example, descriptions are provided using an example in which the network element or the entity corresponding to the source subscription network element is the source AMF network element in the 5G network, and the network element or the entity corresponding to the target subscription network element is the target AMF network element in the 5G network. Certainly, in this embodiment of this application, if the subscription update system 10 shown in FIG. 1 is applied to the current 5G network, the network element or the entity corresponding to the source subscription network element may alternatively be a source SMF network element in the 5G network, the network element or the entity corresponding to the target subscription network element may alternatively be a target SMF network element in the 5G network, and the like. This is not specifically limited in this embodiment of this application.

Optionally, the terminal included in this embodiment of this application may include various devices with a wireless communication function, for example, a handheld device, an in-vehicle device, a wearable device, a computing device, or another processing device connected to a wireless modem. In some implementations, the terminal may include a subscriber unit, a cellular phone, a smartphone, a wireless data card, a personal digital assistant (PDA), a PDA computer, a tablet, a tablet computer, a modem (e.g., a wireless modem), a handheld device, a laptop computer, a cordless phone or a wireless local loop (WLL) station, a machine type communication (MTC) terminal, a user equipment (UE), a mobile station (MS), a terminal device, a relay UE, or the like. For example, the relay UE may be a 5G residential gateway (RG). For ease of description, in this application, the devices mentioned above are collectively referred to as terminals.

Optionally, the access device included in this embodiment of this application is a device that accesses a core network. For example, the access device may be a base station, a broadband network gateway (BNG), an aggregation switch, or a non-3rd Generation Partnership Project (3GPP) access device. The base station may include various forms of base stations, for example, a macro base station, a micro base station (also referred to as a small cell), a relay station, and an access point.

Optionally, the source subscription network element, the target subscription network element, the first event notification network element, the second event notification network element, the network repository function network element, or the unstructured data storage function network element in FIG. 1 in this embodiment of this application may be implemented by one device, or may be jointly implemented by a plurality of devices, or may be a function module in a device. This is not specifically limited in this embodiment of this application. It should be understood that the foregoing functions may be network elements in a hardware device, or may be software functions running on dedicated hardware, or may be virtualized functions instantiated on a platform (for example, a cloud platform).

Figure 3:
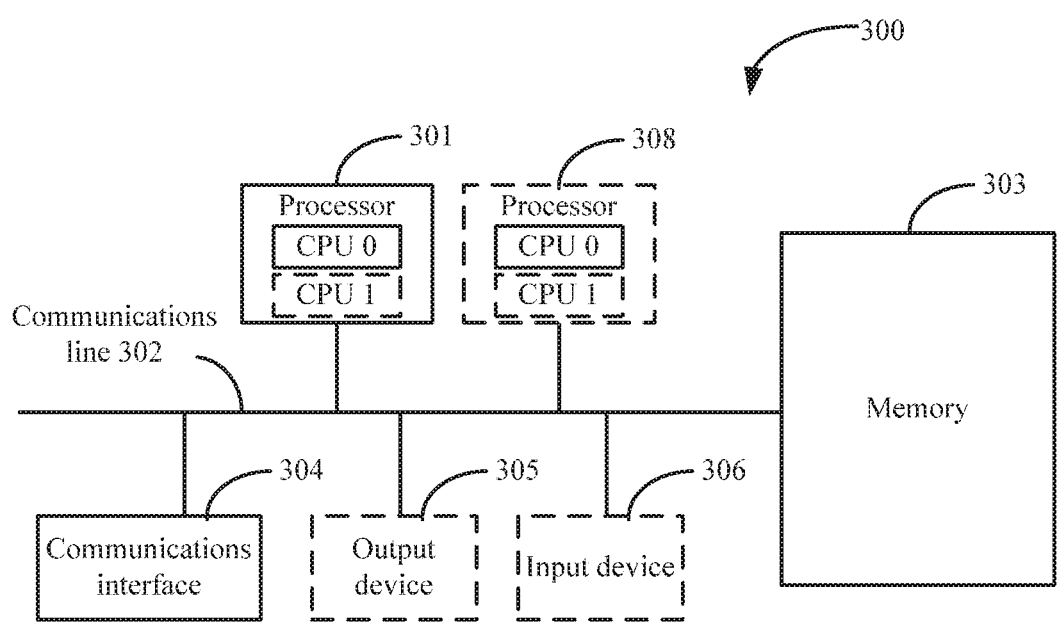
FIG. 3 is a schematic diagram of a hardware structure of a communications device according to an embodiment of this application.

For example, the source subscription network element, the target subscription network element, the first event notification network element, the second event notification network element, the network repository function network element, or the unstructured data storage function network element in FIG. 1 in this embodiment of this application may be implemented by a communications device in FIG. 3. FIG. 3 is a schematic diagram of a hardware structure of a communications device according to an embodiment of this application. The communications device 300 includes at least one processor 301, a communications line 302, a memory 303, and at least one communications interface 304.

The processor 301 may be a general-purpose central processing unit (CPU), a microprocessor, an application-specific integrated circuit (ASIC), or one or more integrated circuits configured to control program execution of the solutions of this application.

The communications line 302 may include a channel that transmits information between the foregoing components.

The communications interface 304, at which any apparatus such as a transceiver is used, is configured to communicate with another device or a communications network, such as Ethernet, a radio access network (RAN), or a wireless local area network (WLAN).

The memory 303 may be a read-only memory (ROM), another type of static storage device that can store static information and an instruction, a random access memory (RAM), or another type of dynamic storage device that can store information and an instruction. Alternatively, the memory 303 may be an electrically erasable programmable read-only memory (EEPROM), a compact disc read-only memory (CD-ROM), another optical disk storage, an optical disc storage (including a compact disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that can be accessed by a computer. However, this is not limited thereto. The memory 303 may exist independently and is connected to the processor using the communication line 302. Alternatively, the memory 303 may be integrated with the processor 301.

The memory 303 is configured to store a computer executable instruction for executing the solutions of this application, and the processor 301 controls execution of the computer executable instruction. The processor 301 is configured to execute the computer executable instruction stored in the memory 303, in order to implement a subscription update method provided in the following embodiments of this application.

Optionally, the computer executable instruction in this embodiment of this application may also be referred to as application program code. This is not specifically limited in this embodiment of this application.

In at least one implementation, in an embodiment, the processor 301 may include one or more CPUs, for example, a CPU 0 and a CPU 1 in FIG. 3.

In at least one implementation, in an embodiment, the communications device 300 may include a plurality of processors, for example, a processor 301 and a processor 308 in FIG. 3. Each of the processors may be a single-core (single-CPU) processor, or may be a multi-core (multi-CPU) processor. The processor herein may be one or more devices, circuits, and/or processing cores used to process data (such as a computer program instruction).

In at least one implementation, in an embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive user input in a plurality of manners. For example, the input device 306 may be a mouse, a keyboard, a touchscreen device, or a sensing device.

The communications device 300 may be a general-purpose device or a dedicated device. In at least one implementation, the communications device 300 may be a desktop computer, a portable computer, a network server, a palmtop computer (PDA), a mobile phone, a tablet computer, a wireless terminal device, an embedded device, or a device with a structure similar to that in FIG. 3. A type of the communications device 300 is not limited in this embodiment of this application.

The following describes in detail a subscription update method provided in the embodiments of this application with reference to FIG. 1 to FIG. 3.

It should be noted that names of messages between network elements in the following embodiments of this application, names of parameters in messages, or the like are merely examples, and there may be other names in other implementations. This is not specifically limited in this embodiment of this application.

Figure 4:
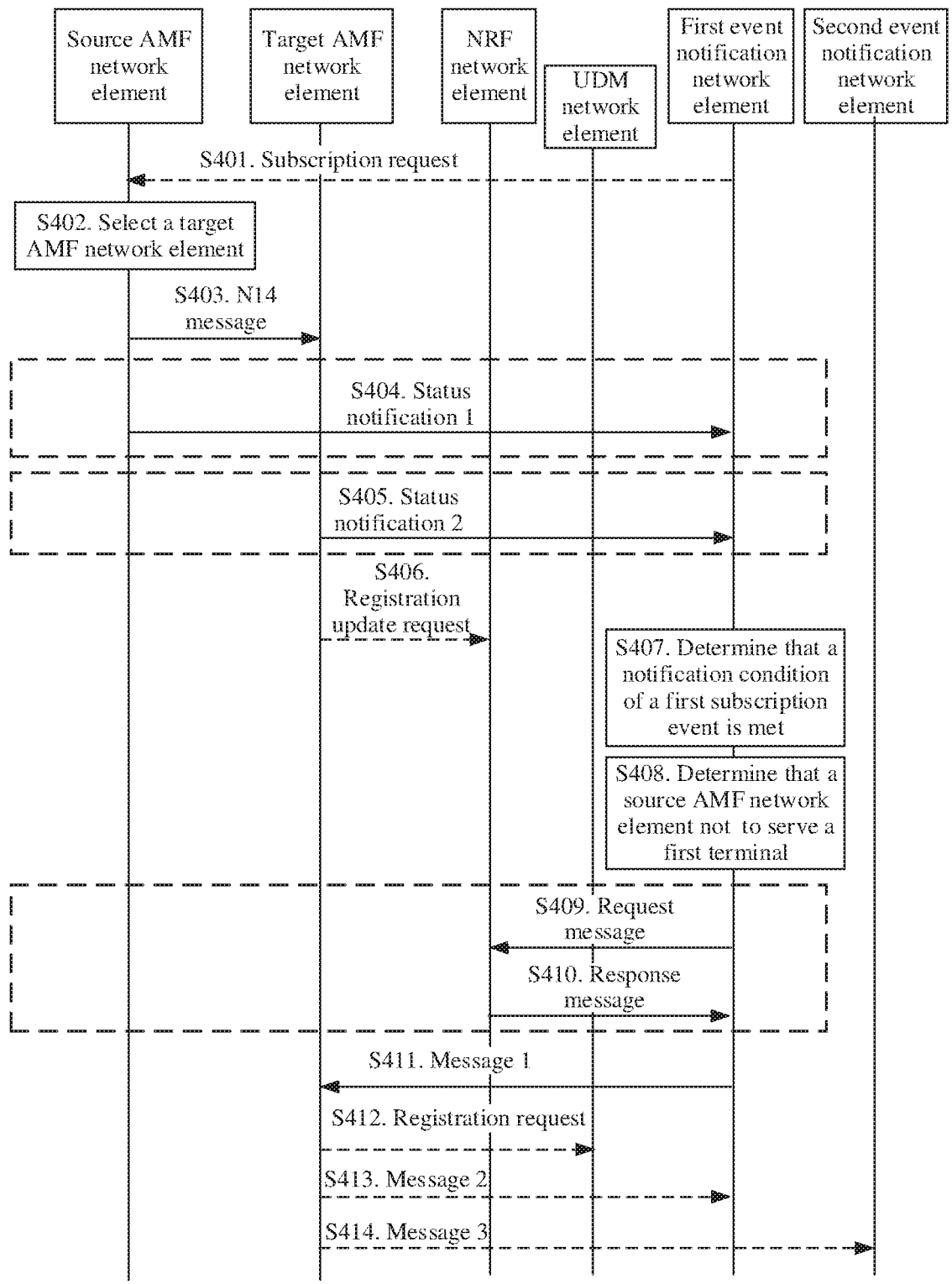
FIG. 4 is a schematic flowchart 1 of a subscription update method according to an embodiment of this application.

An example in which the subscription update system shown in FIG. 1 is applied to the 5G network shown in FIG. 2 is used, and an example in which the source subscription network element is the source AMF network element in the 5G network, and the target subscription network element is the target AMF network element in the 5G network is used. FIG. 4 shows a subscription update method provided in an embodiment of this application. The method includes the following steps.

S401. Before a first terminal migrates from a source AMF network element to a target AMF network element, a first event notification network element sends a subscription request to the source AMF network element, such that the source AMF network element receives the subscription request from the first event notification network element.

Step S401 is an optional step.

The subscription request in this embodiment of this application carries callback address information of the first event notification network element, and is used to subscribe to a status change event of a terminal group to which the first terminal belongs or a status change event of the source AMF network element.

For example, the first event notification network element may send the subscription request to the source AMF network element after receiving a new globally unique access and mobility management function identifier (GUAMI) from the source AMF network element. For example, assuming that the first event notification network element is a UDM network element, when the source AMF network element sends a registration request to the UDM network element to request to register the first terminal as being served by the source AMF network element, the source AMF network element may add, to the registration request, a GUAMI corresponding to the terminal group to which the first terminal belongs. If the UDM network element determines that a status change event corresponding to the GUAMI has never been subscribed to before, the UDM network element may send a subscription request to the source AMF network element. The subscription request carries the GUAMI, and is used to subscribe to the status change event of the terminal group to which the first terminal belongs.

It should be noted that if the first event notification network element in this embodiment of this application is the UDM network element, the first event notification network element in FIG. 4 and a UDM network element in FIG. 4 may comprise one network element. FIG. 4 is described merely using an example in which the first event notification network element and the UDM network element are separated. This is uniformly described herein. This is not specifically limited in this embodiment of this application.

Alternatively, for example, the first event notification network element may perform subscription at a granularity of an AMF. For example, the first event notification network element sends the subscription request to the source AMF network element, where the subscription request does not include any GUAMI. In this case, the source AMF network element may consider by default that the subscription request is used to subscribe to a status change event corresponding to any GUAMI in the source AMF network element.

The GUAMI in this embodiment of this application may include a public land mobile network (PLMN) identifier (ID), an identifier of a region in which an AMF network element is located (AMF region ID), an identifier of an AMF network element group to which an AMF network element belongs (AMF Set ID), an AMF pointer, and the like. For details, refer to existing descriptions. Details are not described herein.

Optionally, the subscription request in this embodiment of this application may further carry a notification correlation identity allocated by the first event notification network element to the status change event. The notification correlation identity is used to determine the status change event. This is not specifically limited in this embodiment of this application.

S402. After the source AMF network element determines no longer to serve a terminal in a terminal group to which the first terminal belongs, the source AMF network element selects a target AMF network element for the terminal in the terminal group to which the first terminal belongs.

For an implementation of selecting, by the source AMF network element, the target AMF network element for the terminal in the terminal group to which the first terminal belongs, refer to an existing implementation. Details are not described herein.

Optionally, in this embodiment of this application, for example, a scenario in which the source AMF network element determines no longer to serve the terminal in the terminal group to which the first terminal belongs may include: a scenario in which the source AMF network element is shut down, a scenario of terminal migration upon scale-in/out of an AMF network element set, or a scenario in which the source AMF is faulty. This is uniformly described herein. This is not specifically limited in this embodiment of this application.

S403. The source AMF network element sends an N14 message to the target AMF network element, such that the target AMF network element receives the N14 message from the source AMF network element.

The N14 message carries a context of the terminal in the terminal group to which the first terminal belongs. The context of the terminal in the terminal group to which the first terminal belongs includes a context of the first terminal. The context of the first terminal includes an identifier of the first terminal and information about all subscription events of the first terminal, for example, information about a first subscription event of the first terminal or information about a second subscription event of the first terminal. For example, the information about the first subscription event may include at least one of a subscription correlation identity allocated by the first event notification network element to the first subscription event, a first notification correlation identity allocated by the source AMF network element to the first subscription event, the callback address information of the first event notification network element, or callback address information, correlated with the first subscription event, of the source AMF network element. This is not specifically limited in this embodiment of this application.

Optionally, in this embodiment of this application, different subscription events of the first terminal may be subscribed to from different event notification network elements. For example, the first subscription event of the first terminal may be subscribed to from the first event notification network element, and the second subscription event of the first terminal may be subscribed to from a second event notification network element. This is not specifically limited in this embodiment of this application.

Optionally, the N14 message in this embodiment of this application may further carry information about the status change event, to which the first event notification network element subscribes from the source AMF network element, of the terminal group to which the first terminal belongs, or information about the status change event, to which the first event notification network element subscribes from the source AMF network element, of the source AMF network element. For example, the information about the status change event of the terminal group to which the first terminal belongs or the information about the status change event of the source AMF network element may include the callback address information of the first event notification network element. The callback address information of the first event notification network element is used to receive a status change notification of the terminal group to which the first terminal belongs. Optionally, for example, the information about the status change event of the terminal group to which the first terminal belongs or the information about the status change event of the source AMF network element may further include a notification correlation identity corresponding to the status change event. The notification correlation identity is used to determine the corresponding status change event. This is not specifically limited in this embodiment of this application.

Optionally, in an implementation, if the subscription update method provided in this embodiment of this application includes the foregoing step S401, the subscription update method provided in this embodiment of this application further includes the following step S404.

S404. The source AMF network element sends a status notification 1 to the first event notification network element, such that the first event notification network element receives the status notification 1 from the source AMF network element. The status notification 1 is used to indicate that the source AMF network element no longer serves the terminal group to which the first terminal belongs.

The status notification 1 may carry a group identifier corresponding to the terminal group to which the first terminal migrated to the target AMF network element belongs.

Optionally, in this embodiment of this application, for example, the group identifier corresponding to the terminal group to which the first terminal belongs may be a GUAMI corresponding to the terminal group to which the first terminal belongs. This is uniformly described herein. Details are not described below again.

Optionally, the status notification 1 may carry an identifier of the target AMF network element, for example, a name of the target AMF network element. This is not specifically limited in this embodiment of this application.

Optionally, the status notification 1 may further carry first callback address information of the target AMF network element. For example, the first callback address information of the target AMF network element may be address information correlated with the terminal group to which the first terminal belongs, namely, address information at a granularity of a GUAMI. Alternatively, the first callback address information of the target AMF network element may be address information correlated with the target AMF network element, namely, address information at a granularity of an AMF network element. This is not specifically limited in this embodiment of this application.

Optionally, in this embodiment of this application, the first callback address information of the target AMF network element is not address information correlated with a subscription event. Therefore, the first callback address information of the target AMF network element may also be referred to as default callback address information of the target AMF network element. For the default callback address information, when the target AMF network element has not performed a terminal-level subscription update, if a first event notification network element needs to send a terminal-related event notification to the target AMF network element, the first event notification network element may send the event notification to a default callback address of the target AMF network element, such that the target AMF network element can learn the event notification of a subscription event in a timely manner, in order to process the corresponding subscription event in a timely manner.

Optionally, in an implementation, if the subscription update method provided in this embodiment of this application includes the foregoing step S401, step S403 includes: subscribing, by the first event notification network element from the source AMF network element, to the information about the status change event of the terminal group to which the first terminal belongs; or subscribing, by the first event notification network element from the target AMF network element, to the status change event of the terminal group to which the first terminal belongs or the status change event of the source AMF network element. Therefore, after step S403, the subscription update method provided in this embodiment of this application further includes the following step S405.

S405. The target AMF network element sends a status notification 2 to the first event notification network element, such that the first event notification network element receives the status notification 2 from the target AMF network element. The status notification 2 is used to indicate that the target AMF network element serves the terminal group to which the first terminal belongs.

The status notification 2 may carry the group identifier corresponding to the terminal group to which the first terminal migrated to the target AMF network element belongs, for example, the GUAMI corresponding to the terminal group to which the first terminal belongs.

Optionally, the status notification 2 may carry the identifier of the target AMF network element, for example, the name of the target AMF network element. This is not specifically limited in this embodiment of this application.

Optionally, the status notification 2 may further carry the first callback address information of the target AMF network element. For related descriptions of the first callback address information of the target AMF network element, refer to the foregoing step S404. Details are not described herein again.

Optionally, in an implementation, after step S403, the subscription update method provided in this embodiment of this application may further include the following step S406.

S406. The target AMF network element sends a registration update request to an NRF network element, such that the NRF network element receives the registration update request from the target AMF network element.

The registration update request is used to request to register the terminal group to which the first terminal belongs as being served by the target AMF.

For example, the registration update request may carry the GUAMI corresponding to the terminal group to which the first terminal belongs or the identifier of the target AMF network element, and the first callback address information of the target AMF network element. After receiving the registration update request, the NRF network element may store a correspondence between the first callback address information of the target AMF network element and the GUAMI corresponding to the terminal group to which the first terminal belongs, or store a correspondence between the first callback address information of the target AMF network element and the identifier of the target AMF network element. This is not specifically limited in this embodiment of this application.

It should be noted that the first callback address information of the target AMF network element may alternatively be sent to the NRF network element when the target AMF network element is registered with the NRF network element for the first time. If the target AMF network element has sent the first callback address information of the target AMF network element to the NRF network element, the first callback address information of the target AMF network element may be not carried in this step. This is uniformly described herein. Details are not described below again.

Optionally, in this embodiment of this application, after receiving the registration update request sent by the target AMF network element to the NRF network element, the NRF network element may further send a status notification 3 to the first event notification network element. The status notification 3 carries the identifier of the target AMF network element and the group identifier corresponding to the terminal group to which the first terminal belongs, and is used to indicate that the target AMF network element serves the terminal group to which the first terminal belongs. Optionally, the status notification 3 may further carry the first callback address information of the target AMF network element. This is not specifically limited in this embodiment of this application.

Further, the subscription update method provided in this embodiment of this application may include the following steps S407 and S408.

S407. The first event notification network element determines that a notification condition of a first subscription event of the first terminal is met.

For example, if the first event notification network element is the UDM network element, and the first subscription event is a subscription change event, when subscription data of the first terminal changes, the UDM network element may determine that the notification condition of the first subscription event is met.

S408. The first event notification network element determines that the source AMF network element no longer serves the first terminal.

In a possible implementation, that the first event notification network element determines that the source AMF network element no longer serves the first terminal includes learning, by the first event notification network element based on the status notification 1 in step S404 or the status notification 2 in step S405, that the source AMF network element no longer serves the first terminal.

In a possible implementation, the first event notification network element does not subscribe to the status change event of the terminal group to which the first terminal belongs (that is, step S401 and step S404 or S405 are not performed). Therefore, that the first event notification network element determines that the source AMF network element no longer serves the first terminal includes: sending, by the first event notification network element, a third event notification of the first subscription event to the source AMF network element based on callback address information of the source AMF network element correlated with the first terminal; and determining, by the first event notification network element, that the source AMF network element is inaccessible.

For example, determining, by the first event notification network element, that the source AMF network element is inaccessible may comprise finding, by the first event notification network element, that a message cannot be sent to the source AMF network element. Alternatively, determining, by the first event notification network element, that the source AMF network element is inaccessible may comprise receiving, by the first event notification network element, a rejection message from the source AMF network element. This is not specifically limited in this embodiment of this application. Optionally, the rejection message may further carry the first callback address information of the target AMF network element. This is not specifically limited in this embodiment of this application.

S409. Optionally, the first event notification network element sends a request message to the NRF network element, such that the NRF network element receives the request message from the first event notification network element.

The request message carries second indication information and at least one of a first group identifier allocated by the source AMF network element to the terminal group to which the first terminal belongs or the identifier of the target AMF network element. The second indication information is used to indicate that the request message is used to request the first callback address information of the target AMF network element.

Optionally, for example, the first group identifier in this embodiment of this application may be the GUAMI corresponding to the terminal group to which the first terminal belongs. This is not specifically limited in this embodiment of this application.

Optionally, the identifier of the target AMF network element in this embodiment of this application may be obtained using the status notification 1 in step S404, the status notification 2 in step S405, or the status notification 3 in step S406. This is not specifically limited in this embodiment of this application.

S410. The NRF network element sends a response message to the first event notification network element, such that the first event notification network element receives the response message from the NRF network element. The response message carries the first callback address information of the target AMF network element.

In this embodiment of this application, after receiving the request message, the NRF network element may determine the first callback address information of the target AMF network element based on the correspondence, stored in step S406, between the first callback address information of the target AMF network element and the GUAMI corresponding to the terminal group to which the first terminal belongs, or between the first callback address information of the target AMF network element and the identifier of the target AMF network element. This is not specifically limited in this embodiment of this application.

Steps S409 and S410 provide an implementation of obtaining, by the first event notification network element, the first callback address information of the target AMF network element. Certainly, the first event notification network element may alternatively obtain the first callback address information of the target AMF network element in another manner. Examples are as follows.

Optionally, in a possible implementation, the status notification 1 in step S404 carries the first callback address information of the target AMF network element, and the first event notification network element may store the status notification 1 after receiving the status notification 1. Further, after the first event notification network element determines that the notification condition of the first subscription event of the first terminal is met, the first event notification network element may determine, based on the stored status notification 1, that the source AMF network element no longer serves the first terminal, and may determine the first callback address information of the target AMF network element.

Alternatively, optionally, in a possible implementation, the status notification 2 in step S405 carries the first callback address information of the target AMF network element, and the first event notification network element may store the status notification 2 after receiving the status notification 2. Further, after the first event notification network element determines that the notification condition of the first subscription event of the first terminal is met, the first event notification network element may determine, based on the stored status notification 2, that the source AMF network element no longer serves the first terminal, and may determine the first callback address information of the target AMF network element.

Alternatively, optionally, in a possible implementation, the status notification 3 in step S406 carries the first callback address information of the target AMF network element, and the first event notification network element may store the status notification 3 after receiving the status notification 3. Further, after the first event notification network element determines that the notification condition of the first subscription event of the first terminal is met, the first event notification network element may determine, based on the stored status notification 3, that the source AMF network element no longer serves the first terminal, and may determine the first callback address information of the target AMF network element.

Alternatively, optionally, in a possible implementation, the rejection message in step S408 carries the first callback address information of the target AMF network element.

An implementation of obtaining, by the first event notification network element, the first callback address information of the target AMF network element is not limited in this embodiment of this application.

Further, the subscription update method provided in this embodiment of this application may include the following step S411.

S411. The first event notification network element sends a message 1 to the target AMF network element based on first callback address information of the target AMF network element, such that the target AMF network element receives the message 1 from the first event notification network element.

The message 1 carries the identifier of the first terminal and a first event notification of the first subscription event. The identifier of the first terminal is used to correlate the first event notification with the first terminal.

Optionally, the message 1 may further carry the first notification correlation identity allocated by the source AMF network element to the first subscription event. The first notification correlation identity is used to determine the first subscription event. This is not specifically limited in this embodiment of this application.

Optionally, the subscription update method provided in this embodiment of this application may further include the following step S412.

S412. The target AMF network element sends a registration request to a UDM network element, such that the UDM network element receives the registration request from the target AMF network element.

The registration request is used to request to register the first terminal as being served by the target AMF network element.

Optionally, in this embodiment of this application, if the target AMF network element re-allocates a corresponding GUAMI to the first terminal, the registration request may further carry a GUAMI allocated by the target AMF network element to the first terminal. This is not specifically limited in this embodiment of this application.

Optionally, the subscription update method provided in this embodiment of this application may further include the following step S413.

S413. The target AMF network element sends a message 2 to the first event notification network element, such that the first event notification network element receives the message 2 from the target AMF network element.

The message 2 carries second callback address information of the target AMF network element and first indication information. The second callback address information is address information correlated with the first subscription event. The first indication information is used to determine the first subscription event. The second callback address information is used by the first event notification network element to send a second event notification of the first subscription event to the target AMF network element based on the second callback address information.

Optionally, the first indication information in this embodiment of this application may be obtained from the context of the first terminal in step S403. For example, the first indication information may include at least one of the identifier of the first terminal or the subscription correlation identity allocated by the first event notification network element to the first subscription event. This is not specifically limited in this embodiment of this application.

Optionally, the message 2 in this embodiment of this application may further carry a second notification correlation identity allocated by the target AMF network element to the first subscription event. Correspondingly, the second callback address information is further used by the first event notification network element to send the second notification correlation identity to the target AMF network element based on the second callback address information. The second notification correlation identity is used to determine the first subscription event. This is not specifically limited in this embodiment of this application.

Optionally, the message 2 in this embodiment of this application may be a subscription update message or a subscription request message. This is not specifically limited in this embodiment of this application.

Optionally, the subscription update method provided in this embodiment of this application may further include the following step S414.

S414. The target AMF network element sends a message 3 to a second event notification network element, such that the second event notification network element receives the message 3 from the target AMF network element.

The message 3 carries third callback address information of the target AMF network element and third indication information. The third callback address information is address information correlated with the second subscription event. The third indication information is used to determine the second subscription event. The third callback address information is used by the second event notification network element to send a fourth event notification of the second subscription event to the target AMF network element based on the third callback address information.

Optionally, the third indication information in this embodiment of this application may be obtained from the context of the first terminal in step S403. For example, the third indication information may include at least one of the identifier of the first terminal or a subscription correlation identity allocated by the second event notification network element to the second subscription event. This is not specifically limited in this embodiment of this application.

Optionally, the message 3 in this embodiment of this application may further carry a third notification correlation identity allocated by the target AMF network element to the second subscription event. Correspondingly, the third callback address information is further used by the second event notification network element to send the third notification correlation identity to the target AMF network element based on the third callback address information. The third notification correlation identity is used to determine the second subscription event. This is not specifically limited in this embodiment of this application.

Optionally, the message 3 in this embodiment of this application may be a subscription update message or a subscription request message. This is not specifically limited in this embodiment of this application.

Optionally, in this embodiment of this application, if the first terminal further subscribes to another event from the first event notification network element or the second event notification network element, or the first terminal further subscribes to a corresponding event from another event notification network element, for a corresponding subscription event, refer to the subscription update manner of the first subscription event in the foregoing step S413 or the second subscription event in step S414 to perform an update. Details are not described herein again one by one.

Optionally, there is no necessary execution sequence between steps S412, S413, and S414 in this embodiment of this application. Any one of the steps may be performed first, then another step is performed, and finally the remaining step is performed; or any one of the steps may be performed first, and then the remaining two steps are simultaneously performed; or two of the steps may be simultaneously performed first, and then the remaining step is performed; or the like. This is not specifically limited in this embodiment of this application.

In other words, in this embodiment of this application, in a scenario in which the first terminal has migrated from the source AMF network element to the target AMF network element, satisfying the notification condition of the first subscription event may also trigger the target AMF network element to send, to a corresponding event notification network element, callback address information, correlated with a remaining subscription event other than the first subscription event of the first terminal, of the target AMF network element. In this way, after a notification condition of the subscription event is subsequently met, the corresponding event notification network element may directly send a corresponding event notification to the target AMF network element based on the callback address information, correlated with the subscription event, of the target AMF network element. This avoids a problem that a target AMF network element currently serving a terminal cannot learn an event notification of a subscription event in a timely manner, and therefore cannot process the corresponding subscription event in a timely manner.

According to the subscription update method provided in this embodiment of this application, a target AMF network element can learn an event notification of a subscription event in a timely manner in a scenario in which a terminal has migrated from a source AMF network element to the target AMF network element, in order to process the corresponding subscription event in a timely manner. For an analysis on related technical effects, refer to the descriptions of the technical effects of the subscription update system. Details are not described herein again.

The actions of the first event notification network element, the second event notification network element, the source AMF network element, the target AMF network element, the UDM network element, or the NRF network element in the foregoing steps S401 to S414 may be performed by the processor 301 in the communications device 300 shown in FIG. 3 by invoking the application program code stored in the memory 303. This is not limited in this embodiment.

Figure 5:
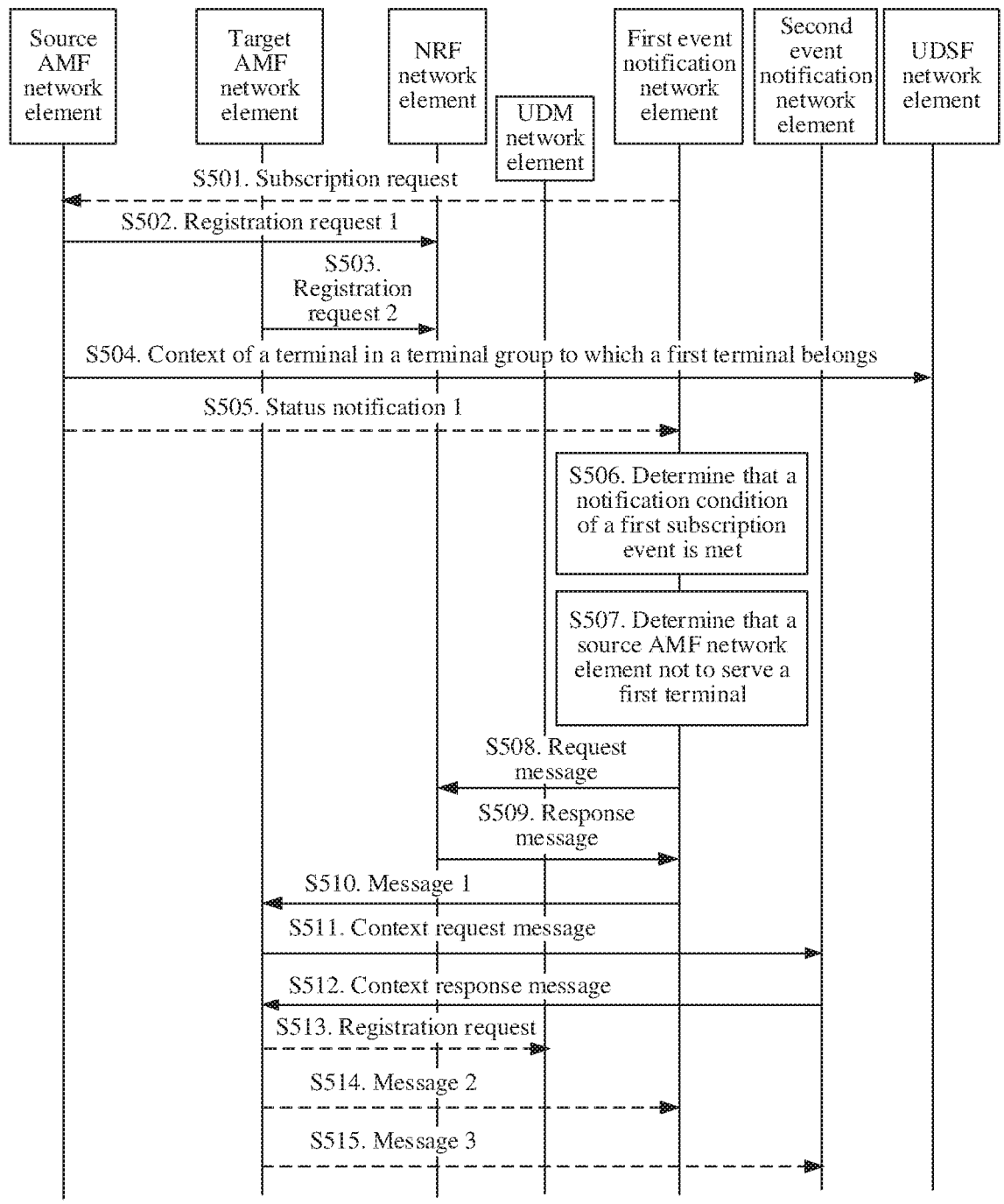
FIG. 5 is a schematic flowchart 2 of a subscription update method according to an embodiment of this application.

Optionally, an example in which the subscription update system shown in FIG. 1 is applied to the 5G network shown in FIG. 2 is used, and an example in which the source subscription network element is the source AMF network element in the 5G network, and the target subscription network element is the target AMF network element in the 5G network is used. FIG. 5 shows another subscription update method provided in an embodiment of this application. The method includes the following steps.

S501. This step is the same as step S401. For related descriptions, refer to the foregoing step S401. Details are not described herein again.

In this embodiment of this application, step S501 is an optional step. This is uniformly described herein. Details are not described below again.

S502. The source AMF network element sends a registration request 1 to an NRF network element, such that the NRF network element receives the registration request 1 from the source AMF network element.

The registration request 1 is used to request to register first callback address information of the source AMF network element with the NRF network element. For example, the first callback address information of the source AMF network element may be address information correlated with a terminal group to which a first terminal served by the source AMF network element belongs, namely, address information at a granularity of a GUAMI. Alternatively, the first callback address information of the source AMF network element may be address information correlated with the source AMF network element, namely, address information at a granularity of an AMF network element. This is not specifically limited in this embodiment of this application.

Optionally, in this embodiment of this application, the first callback address information of the source AMF network element is not address information correlated with a subscription event. Therefore, the first callback address information of the source AMF network element may also be referred to as default callback address information of the source AMF network element. For the default callback address information, when the source AMF network element has not performed a terminal-level subscription update, if an event providing network element needs to send a terminal-related event notification to the source AMF network element, an event notification network element may send the event notification to a default callback address of the source AMF network element, such that the source AMF network element can learn the event notification of a subscription event in a timely manner, in order to process the corresponding subscription event in a timely manner.

S503. The target AMF network element sends a registration request 2 to the NRF network element, such that the NRF network element receives the registration request 2 from the target AMF network element.

The registration request 2 is used to request to register first callback address information of the target AMF network element with the NRF network element. For related descriptions of the first callback address information of the target AMF network element, refer to the foregoing step S404. Details are not described herein again.

Optionally, there is no necessary execution sequence between steps S502 and S503 in this embodiment of this application. Step S502 may be performed before step S503, or step S503 may be performed before step S502, or step S502 and step S503 may be simultaneously performed. This is not specifically limited in this embodiment of this application.

S504. After the source AMF network element determines no longer to serve a terminal in a terminal group to which the first terminal belongs, the source AMF network element sends, to a UDSF network element, a context of the terminal in the terminal group to which the first terminal belongs, such that the UDSF network element receives, from the source AMF network element, the context of the terminal in the terminal group to which the first terminal belongs.

For related descriptions of the context of the terminal in the terminal group to which the first terminal belongs, refer to the foregoing step S403. Details are not described herein again.

Optionally, if the subscription update method provided in this embodiment of this application includes the foregoing step S501, the subscription update method provided in this embodiment of this application further includes the following step S505.

S505. This step is similar to step S404. For example, a difference lies in: Step S505 in this embodiment does not carry first callback address information of the target AMF network element or an identifier of the target AMF network element. For related descriptions, refer to the foregoing step S404. Details are not described herein again.

S506. This step is the same as step S407. For related descriptions, refer to the foregoing step S407. Details are not described herein again.

S507. The first event notification network element determines that the source AMF network element no longer serves the first terminal.

In a possible implementation, that the first event notification network element determines that the source AMF network element no longer serves the first terminal includes: after receiving a status notification 1 from the source AMF network element (step S505), the first event notification network element may store the status notification 1. Further, after the first event notification network element determines that a notification condition of a first subscription event of the first terminal is met, the first event notification network element may learn, based on the stored status notification 1, that the source AMF network element no longer serves the first terminal.

In a possible implementation, the first event notification network element does not subscribe to a status change event of the terminal group to which the first terminal belongs (that is, steps S501 and S505 are not performed). Therefore, that the first event notification network element determines that the source AMF network element no longer serves the first terminal includes: sending, by the first event notification network element, a third event notification of the first subscription event to the source AMF network element based on callback address information of the source AMF network element correlated with the first terminal; and determining, by the first event notification network element, that the source AMF network element is inaccessible.

For example, determining, by the first event notification network element, that the source AMF network element is inaccessible may comprise finding, by the first event notification network element, that a message cannot be sent to the source AMF network element. Alternatively, determining, by the first event notification network element, that the source AMF network element is inaccessible may comprise receiving, by the first event notification network element, a rejection message from the source AMF network element. This is not specifically limited in this embodiment of this application.

S508. The first event notification network element sends a request message to the NRF network element, such that the NRF network element receives the request message from the first event notification network element.

The request message carries second indication information and a set identifier of an AMF network element set corresponding to a group identifier of the terminal group to which the first terminal belongs. The second indication information is used to indicate that the request message is used to request the first callback address information of the target AMF network element. For example, the set identifier may be an AMF set ID in a GUAMI corresponding to the terminal group to which the first terminal belongs.

S509. The NRF network element sends a response message to the first event notification network element, such that the first event notification network element receives the response message from the NRF network element. The response message carries the first callback address information of the target AMF network element.

Optionally, in this embodiment of this application, after receiving the request message, the NRF network element may determine, based on the set identifier of the AMF network element set, the target AMF network element serving the first terminal, and may further determine the first callback address information of the target AMF network element based on stored first callback address information of an AMF network element.

Alternatively, optionally, in this embodiment of this application, after receiving the request message, the NRF network element may send, to the first event notification network element, first callback address information of all available AMF network elements in the AMF network element set corresponding to the set identifier of the AMF network element set. The first event notification network element selects one AMF network element from all the available AMF network elements, and determines first callback address information of the selected AMF network element as the first callback address information of the target AMF network element. This is not specifically limited in this embodiment of this application.

S510. This step is the same as step S411. For related descriptions, refer to the foregoing step S411. Details are not described herein again.

S511. The target AMF network element sends a context request message to the UDSF network element, such that the UDSF network element receives the context request message from the target AMF network element.

The context request message is used to request a context of the first terminal. For related descriptions of the context of the first terminal, refer to the foregoing step S403. Details are not described herein again.

S512. The UDSF network element sends a context response message to the target AMF network element, such that the target AMF network element receives the context response message from the UDSF network element.

The context response message carries the context of the first terminal.

Optionally, the subscription update method provided in this embodiment of this application may further include the following steps.

S513-S515. These steps are the same as steps S412-S414. For related descriptions, refer to the foregoing steps S412-S414. Details are not described herein again.

According to the subscription update method provided in this embodiment of this application, a target AMF network element can learn an event notification of a subscription event in a timely manner in a scenario in which a terminal has migrated from a source AMF network element to the target AMF network element, in order to process the corresponding subscription event in a timely manner. For an analysis on related technical effects, refer to the descriptions of the technical effects the subscription update system. Details are not described herein again.

The actions of the first event notification network element, the second event notification network element, the source AMF network element, the target AMF network element, the UDM network element, the NRF network element, or the UDSF network element in the foregoing steps S501 to S515 may be performed by the processor 301 in the communications device 300 shown in FIG. 3 by invoking the application program code stored in the memory 303. This is not limited in this embodiment.

Figure 6:
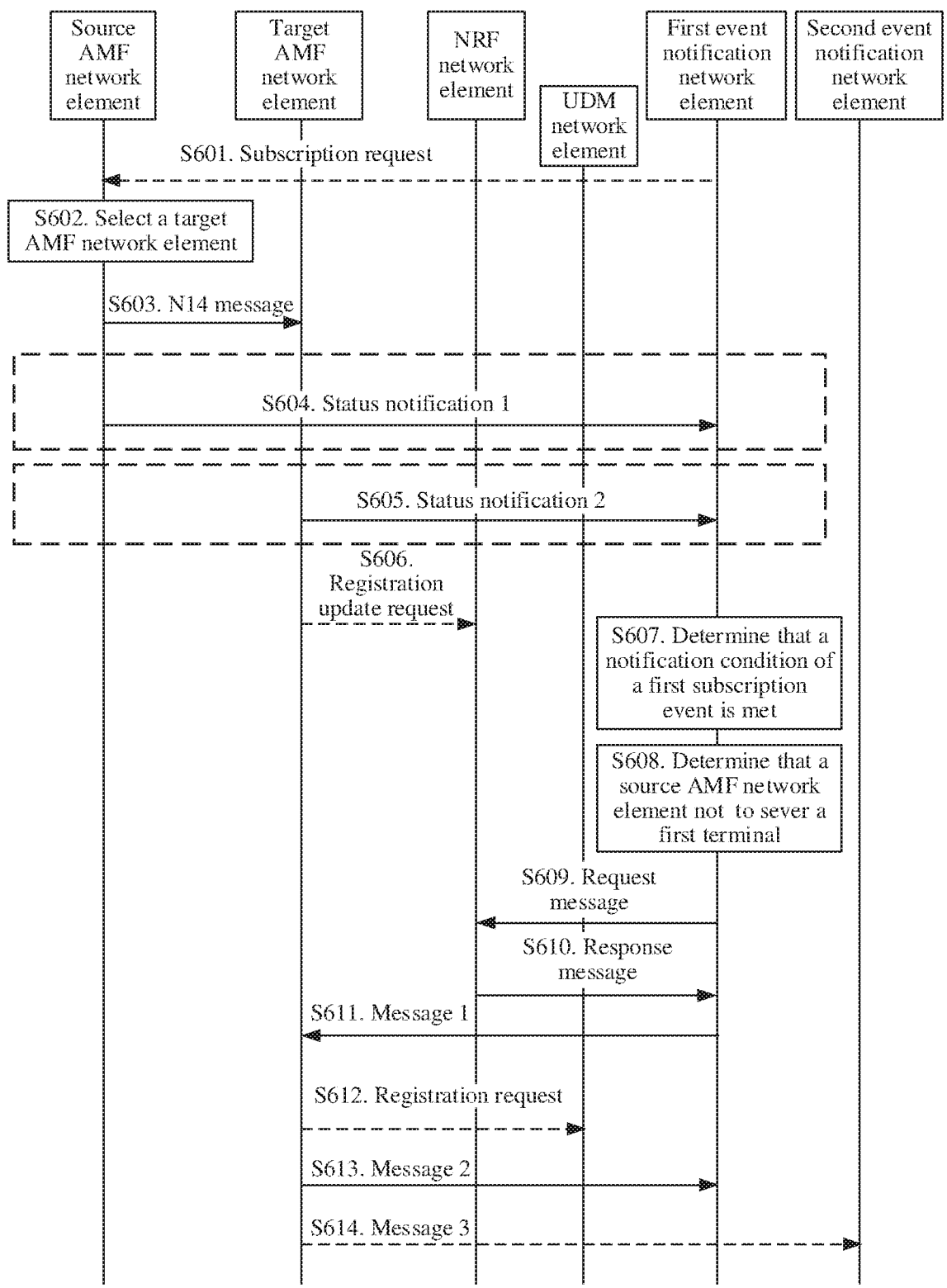
FIG. 6 is a schematic flowchart 3 of a subscription update method according to an embodiment of this application.

Optionally, an example in which the subscription update shown in FIG. 1 is applied to the 5G network shown in FIG. 2 is used, and an example in which the source subscription network element is the source AMF network element in the 5G network, and the target subscription network element is the target AMF network element in the 5G network is used. FIG. 6 shows another subscription update method provided in an embodiment of this application. The method includes the following steps.

S601. This step is the same as step S401. For related descriptions, refer to the foregoing step S401. Details are not described herein again.

In this embodiment of this application, step S601 is an optional step. This is uniformly described herein. Details are not described below again.

S602 and S603. These steps are the same as steps S402 and S403. For related descriptions, refer to the foregoing steps S402 and S403. Details are not described herein again.

S604 and S605. These steps are similar to steps S404 and S405. For example, a difference lies in: Steps S604 and S605 in this embodiment do not carry first callback address information of the target AMF network element. For related descriptions, refer to the foregoing steps S404 and S405. Details are not described herein again. In this embodiment of this application, steps S604 and S605 are both optional steps. This is uniformly described herein. Details are not described below again.

S606. This step is similar to step S406. For example, a difference lies in: Step S606 in this embodiment does not carry the first callback address information of the target AMF network element, but carries address information of a first service of the target AMF network element. The first service is used to trigger a subscription update of a first subscription event. For related descriptions, refer to the foregoing step S406. Details are not described herein again.

Alternatively, optionally, in this embodiment of this application, the address information of the first service may alternatively be sent to the NRF network element when the target AMF network element is registered with the NRF network element for the first time. This is not specifically limited in this embodiment of this application.

S607. This step is the same as step S407. For related descriptions, refer to the foregoing step S407. Details are not described herein again.

S608. This step is similar to step S408. For example, a difference lies in: A rejection message in step S606 in this embodiment does not carry the first callback address information of the target AMF network element. For related descriptions, refer to the foregoing step S408. Details are not described herein again.

S609. The first event notification network element sends a request message to the NRF network element, such that the NRF network element receives the request message from the first event notification network element.

The request message carries information about the target AMF network element and second indication information. The second indication information is used to indicate that the request message is used to request the address information of the first service of the target AMF network element.

Optionally, in this embodiment of this application, for example, the information about the target AMF network element may be an identifier of the target AMF network element, an Internet Protocol (IP) address of the target AMF network element, or a fully qualified domain name (FQDN) of the target AMF network element. This is not specifically limited in this embodiment of this application.

S610. The NRF network element sends a response message to the first event notification network element, such that the first event notification network element receives the response message from the NRF network element. The response message carries the address information of the first service of the target AMF network element.

In this embodiment of this application, after receiving the request message, the NRF network element may determine the address information of the first service of the target AMF network element based on a correspondence, stored in step S606, between the address information of the first service of the target AMF network element and the information about the target AMF network element. This is not specifically limited in this embodiment of this application.

S611. The first event notification network element sends a message 1 to the target AMF network element based on the address information of the first service, such that the target AMF network element receives the message 1 from the first event notification network element.

The message 1 carries an identifier of the first terminal, and is used to request the target AMF network element to update subscription of the first terminal.

S612. This step is the same as step S412. For related descriptions, refer to the foregoing step S412. Details are not described herein again.

In this embodiment of this application, step S612 is an optional step. This is uniformly described herein. Details are not described below again.

S613. This step is the same as step S413. For related descriptions, refer to the foregoing step S413. Details are not described herein again.

S614. This step is the same as step S414. For related descriptions, refer to the foregoing step S414. Details are not described herein again.

In this embodiment of this application, step S614 is an optional step. This is uniformly described herein. Details are not described below again.

According to the subscription update method provided in this embodiment of this application, a target AMF network element can learn an event notification of a subscription event in a timely manner in a scenario in which a terminal has migrated from a source AMF network element to the target AMF network element, in order to process the corresponding subscription event in a timely manner. For an analysis on related technical effects, refer to the technical effects the subscription update system. Details are not described herein again.

The actions of the first event notification network element, the second event notification network element, the source AMF network element, the target AMF network element, the UDM network element, or the NRF network element in the foregoing steps S601 to S614 may be performed by the processor 301 in the communications device 300 shown in FIG. 3 by invoking the application program code stored in the memory 303. This is not limited in this embodiment.

Figure 7:
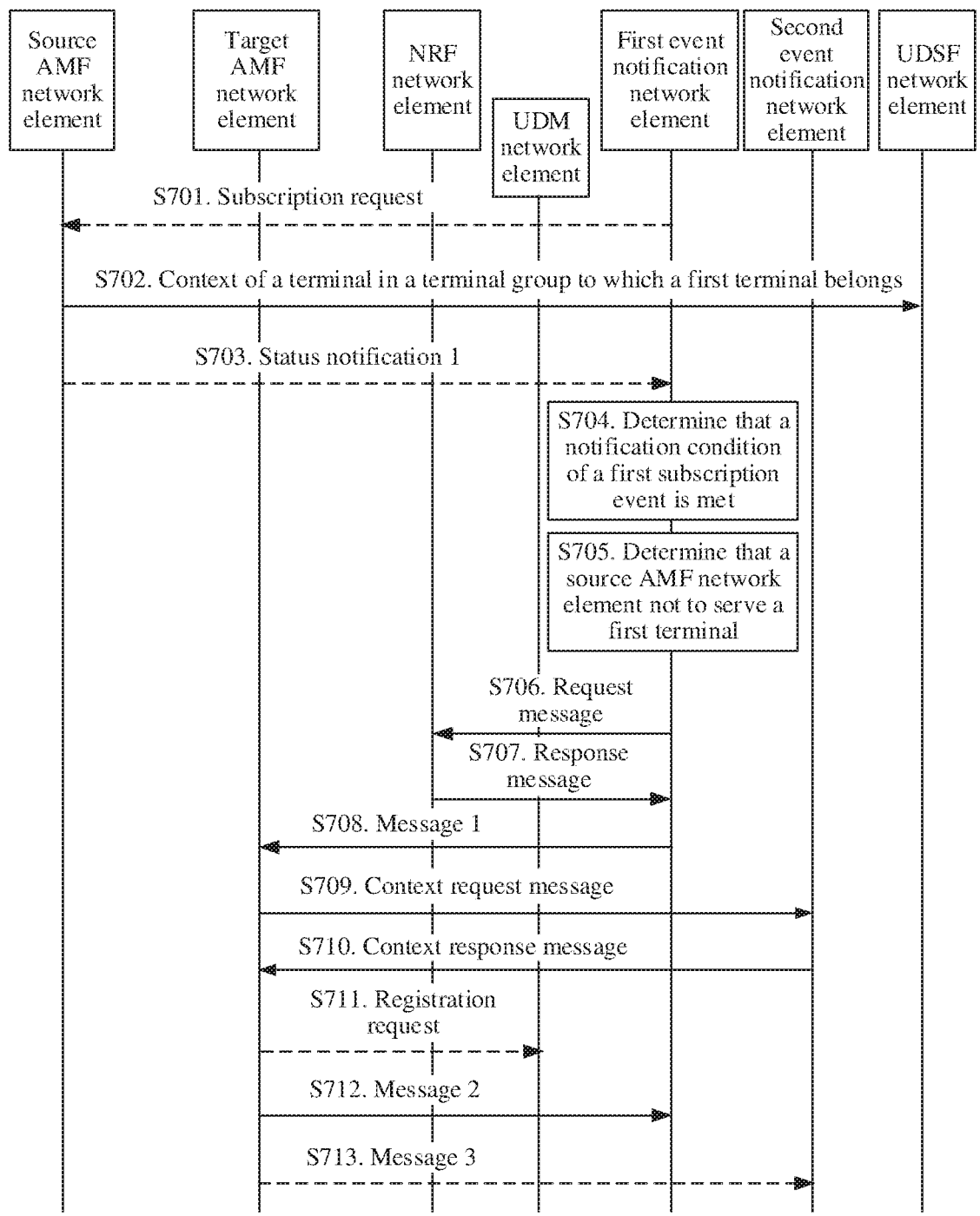
FIG. 7 is a schematic flowchart 4 of a subscription update method according to an embodiment of this application.

Optionally, an example in which the subscription update shown in FIG. 1 is applied to the 5G network shown in FIG. 2 is used, and an example in which the source subscription network element is the source AMF network element in the 5G network, and the target subscription network element is the target AMF network element in the 5G network is used. FIG. 7 shows another subscription update method provided in an embodiment of this application. The method includes the following steps.

S701. This step is the same as step S501. For related descriptions, refer to the foregoing step S501. Details are not described herein again.

In this embodiment of this application, step S701 is an optional step. This is uniformly described herein. Details are not described below again.

S702. This step is the same as step S504. For related descriptions, refer to the foregoing step S504. Details are not described herein again.

Optionally, if the subscription update method provided in this embodiment of this application includes the foregoing step S701, the subscription update method provided in this embodiment of this application further includes the following step S703.

S703. This step is the same as step S505. For related descriptions, refer to step S505. Details are not described herein again.

Further, the subscription update method provided in this embodiment of this application includes the following steps.

S704 and S705. These steps are the same as steps S506 and S507. For related descriptions, refer to steps S506 and S507. Details are not described herein again.

S706. The first event notification network element sends a request message to the NRF network element, such that the NRF network element receives the request message from the first event notification network element.

The request message carries second indication information and a set identifier of an AMF network element set corresponding to a group identifier of the terminal group to which the first terminal belongs. The second indication information is used to indicate that the request message is used to request address information of a first service of the target AMF network element. The first service is used to trigger a subscription update of the first subscription event. For example, the set identifier may be an AMF set ID in a GUAMI corresponding to the terminal group to which the first terminal belongs.

For example, the second indication information may be a type of the first service. This is uniformly described herein. This is not specifically limited in this embodiment of this application.

S707. The NRF network element sends a response message to the first event notification network element, such that the first event notification network element receives the response message from the NRF network element. The response message carries address information of a first service of the target AMF network element.

Optionally, in this embodiment of this application, after receiving the request message, the NRF network element may determine, based on the set identifier of the AMF network element set, the target AMF network element serving the first terminal, and may further determine the address information of the first service of the target AMF network element based on a correspondence between the address information of the first service of the target AMF network element and information about the target AMF network element.

Alternatively, optionally, in this embodiment of this application, the NRF network element may send, to the first event notification network element, first-service address information of all available AMF network elements in the AMF network element set corresponding to the set identifier of the AMF network element set. The first event notification network element selects one AMF network element from all the available AMF network elements, and determines first-service address information of the selected AMF network element as the address information of the first service of the target AMF network element. This is not specifically limited in this embodiment of this application.

Optionally, in this embodiment of this application, the address information of the first service of the target AMF network element is sent by the target AMF network element to the NRF network element. For example, the target AMF network element may send the address information of the first service of the target AMF network element to the NRF network element when the target AMF network element is registered with the NRF network element for the first time. Alternatively, the target AMF network element may send the address information of the first service of the target AMF network element to the NRF network element in a subsequent registration update process. This is not specifically limited in this embodiment of this application.

S708. This step is the same as step S611. For related descriptions, refer to the foregoing step S611. Details are not described herein again.

S709 and S710. These steps are the same as steps S511 and S512. For related descriptions, refer to the foregoing steps S511 and S512. Details are not described herein again.

S711-S713. These steps are the same as steps S612-S614. For related descriptions, refer to the foregoing steps S612-S614. Details are not described herein again.

According to the subscription update method provided in this embodiment of this application, a target AMF network element can learn an event notification of a subscription event in a timely manner in a scenario in which a terminal has migrated from a source AMF network element to the target AMF network element, in order to process the corresponding subscription event in a timely manner. For an analysis on related technical effects, refer to the descriptions of the technical effects the subscription update system. Details are not described herein again.

The actions of the first event notification network element, the second event notification network element, the source AMF network element, the target AMF network element, the UDM network element, the NRF network element, or the UDSF network element in the foregoing steps S701 to S713 may be performed by the processor 301 in the communications device 300 shown in FIG. 3 by invoking the application program code stored in the memory 303. This is not limited in this embodiment.

Figure 8:
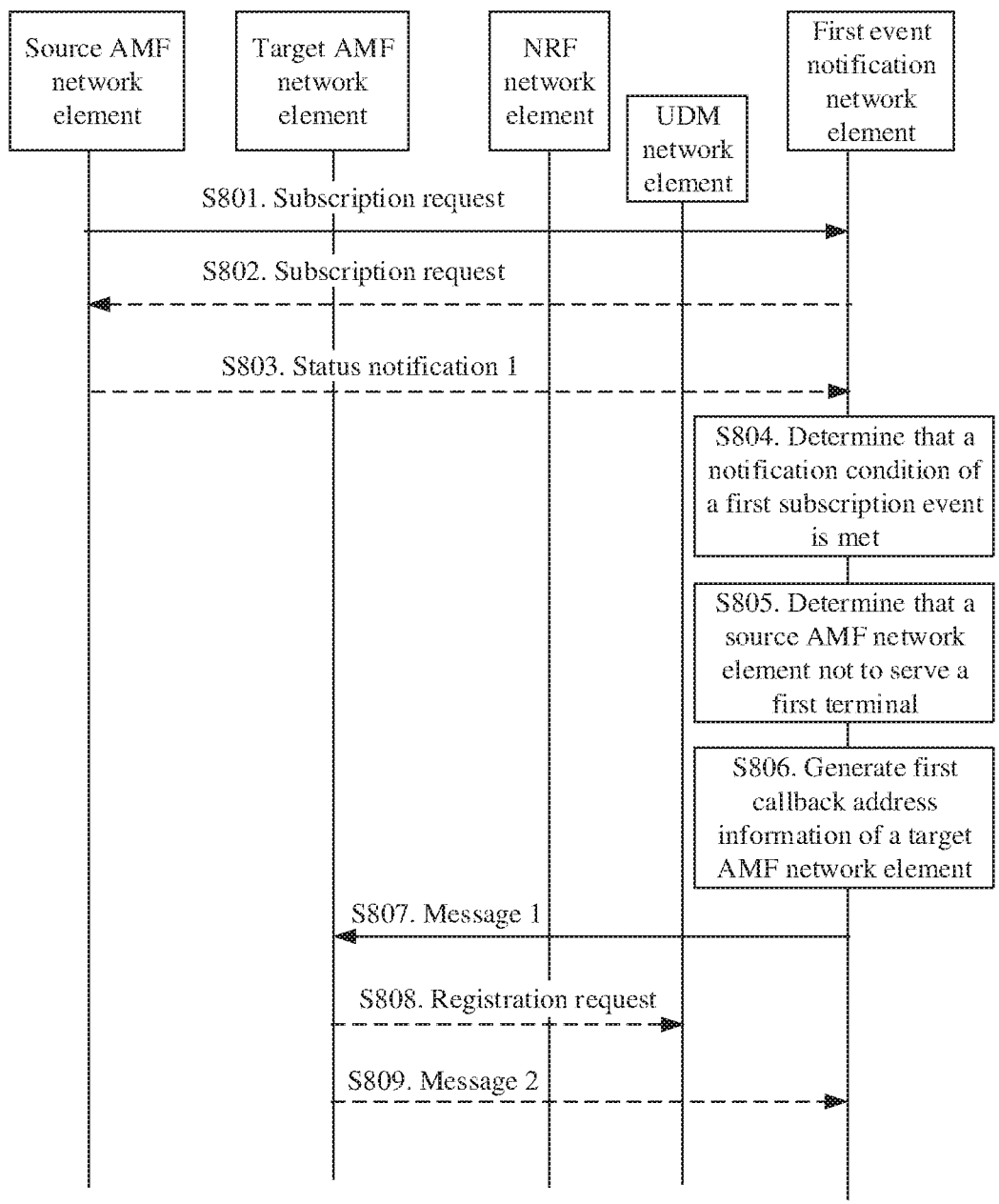
FIG. 8 is a schematic flowchart 5 of a subscription update method according to an embodiment of this application.

Optionally, an example in which the subscription update shown in FIG. 1 is applied to the 5G network shown in FIG. 2 is used, and an example in which the source subscription network element is the source AMF network element in the 5G network, and the target subscription network element is the target AMF network element in the 5G network is used. FIG. 8 shows another subscription update method provided in an embodiment of this application. The method includes the following steps.

S801. A source AMF network element sends a subscription request to a first event notification network element, such that the first event notification network element receives the subscription request from the source AMF network element.

The subscription request carries first callback address information, corresponding to a first subscription event of a first terminal, of the source AMF network element. The first callback address information of the source AMF network element includes information about the source AMF network element.

Optionally, the first callback address information of the source AMF network element may further include at least one of information about the first terminal or information about the first subscription event. The information about the first terminal is used to determine the first terminal corresponding to the first subscription event. The information about the first subscription event is used to determine the first subscription event. This is not specifically limited in this embodiment of this application.

For example, in this embodiment of this application, a format of the first callback address information of the source AMF network element may be: http://<amf>/{GUAMI}/{uecontextid}/subscriptiondata.

In this embodiment of this application, <amf> is information about an AMF network element, and is used to identify the AMF network element. For example, <amf> in the first callback address information of the source AMF network element is the information about the source AMF network element. For example, the information about the source AMF network element may be an IP address of the source AMF network element or an FQDN of the source AMF network element. This is not specifically limited in this embodiment of this application.

In this embodiment of this application, {uecontextid} may be an identifier of a terminal. For example, {uecontextid} in the first callback address information of the source AMF network element is an identifier of the first terminal. For example, the identifier of the first terminal may be a subscription permanent identifier (SUPI) of the first terminal, a globally unique temporary identity (GUTI) of the first terminal, or a permanent equipment identity (PEI). This is not specifically limited in this embodiment of this application.

Optionally, in this embodiment of this application, {uecontextid} may alternatively be used to indicate a storage location of a terminal context. For example, when a context of the first terminal is stored in a UDSF network element, {uecontextid} in the first callback address information of the source AMF network element is used to indicate a storage location of the context of the first terminal on the UDSF network element, such that the context of the first terminal that is stored in the UDSF network element may be located based on the first callback address information of the source AMF network element. This is not specifically limited in this embodiment of this application.

In this embodiment of this application, subscriptiondata is used to identify subscription. For example, subscriptiondata in the first callback address information of the source AMF network element is used to identify first subscription. Optionally, in this embodiment, if the first subscription is session-related subscription, subscription data includes a session identifier of a session related to the first subscription. This is not specifically limited in this embodiment of this application.

Alternatively, for example, in this embodiment of this application, a format of the first callback address information of the source AMF network element may be: http://<amf>/{GUAMI}/{uecontextid}/subscriptiondata.

GUAMI is a group identifier of a terminal group to which the first terminal belongs. For descriptions of <amf>, {uecontextid}, and subscriptiondata, refer to the foregoing example. Details are not described herein again. Alternatively, in this example, uecontextid may alternatively be used to indicate a relative location of a context of the first terminal in a context of a terminal in the terminal group. This is not specifically limited in this example.

Certainly, the foregoing provides two formats of the first callback address information of the source AMF network element merely as examples. Certainly, the first callback address information of the source AMF network element may alternatively be in another format. This is not specifically limited in this embodiment of this application.

S802. This step is the same as step S501. For related descriptions, refer to the foregoing step S501. Details are not described herein again.

In this embodiment of this application, step S802 is an optional step. This is uniformly described herein. Details are not described below again.

Optionally, in this embodiment of this application, after step S802, the subscription update method provided in this embodiment of this application may further include step S803:

S803. After the source AMF network element determines no longer to serve a terminal in a terminal group to which the first terminal belongs, the source AMF network element sends a status notification 1 to the first event notification network element, such that the first event notification network element receives the status notification 1 from the source AMF network element. The status notification 1 is used to indicate that the source AMF network element no longer serves the terminal group to which the first terminal belongs.

The status notification 1 may carry the group identifier corresponding to the terminal group to which the first terminal migrated to the target AMF network element belongs, for example, the GUAMI corresponding to the terminal group to which the first terminal belongs.

Optionally, the status notification 1 may carry the identifier of the target AMF network element, for example, the name of the target AMF network element. This is not specifically limited in this embodiment of this application.

Further, the subscription update method provided in this embodiment of this application may include the following steps.

S804 and S805. These steps are the same as steps S506 and S507. For related descriptions, refer to the foregoing steps S506 and S507. Details are not described herein again.

S806. The first event notification network element generates, for the first subscription event, corresponding first callback address information of the target AMF network element.

In this embodiment of this application, information in the first callback address information of the target AMF network element includes information about the target AMF network element. For example, the information about the target AMF network element may be an IP address of the target AMF network element or an FQDN of the target AMF network element. This is not specifically limited in this embodiment of this application.

Optionally, in this embodiment of this application, the information about the target AMF network element may be carried in the status notification 1 in step S803, or may be obtained in another manner. For example, in a scenario in which a UDSF network element exists, the first event notification network element may query a domain name system (DNS) or an NRF network element based on information about an AMF network element set (for example, an FQDN of the AMF network element set) in a GUAMI corresponding to the first terminal. The DNS or the NRF network element returns, to the first event notification network element, FQDNs or IP addresses of available AMF network elements in the AMF network element set. Further, the first event notification network element selects one AMF network element from the available AMF network elements as the target AMF network element, and determines an FQDN or an IP address of the target AMF network element as the information about the target AMF network element. This is not specifically limited in this embodiment of this application.

Optionally, in a possible implementation, that the first event notification network element generates, for the first subscription event, corresponding first callback address information of the target AMF network element includes generating, by the first event notification network element for the first subscription event, the corresponding first callback address information of the target AMF network element based on the first callback address information of the source AMF network element that is carried in the subscription request. For example, the first event notification network element substitutes the information about the target AMF network element for the information about the source AMF network element that is in the first callback address information http://<source amf>/{uecontextid}/subscriptiondata of the source AMF network element, to obtain the first callback address information http://<target amf>/{ue-contextid}/subscriptiondata of the target AMF network element.

Optionally, in another possible implementation, that the first event notification network element generates, for the first subscription event, corresponding first callback address information of the target AMF network element includes generating, by the first event notification network element for the first subscription event, the corresponding first callback address information of the target AMF network element based on a preset callback address format. For the preset callback address format, refer to the descriptions of the first callback address information of the source AMF network element in the foregoing step S801. Details are not described herein again.

S807. The first event notification network element sends a message 1 to the target AMF network element based on the first callback address information of the target AMF network element, such that the target AMF network element receives the message 1 from the first event notification network element.

The message 1 carries a first event notification of the first subscription event.

Optionally, the subscription update method provided in this embodiment of this application may further include the following steps.

S808. This step is the same as step S412. For related descriptions, refer to the foregoing step S412. Details are not described herein again.

S809. The target AMF network element sends a message 2 to the first event notification network element, such that the first event notification network element receives the message 2 from the target AMF network element.

The message 2 may carry a notification correlation identity allocated by the target AMF network element to the first subscription event. The notification correlation identity is used to determine the first subscription event. This is not specifically limited in this embodiment of this application.

According to the subscription update method provided in this embodiment of this application, a target AMF network element can learn an event notification of a subscription event in a timely manner in a scenario in which a terminal has migrated from a source AMF network element to the target AMF network element, in order to process the corresponding subscription event in a timely manner. For an analysis on related technical effects, refer to the descriptions of the technical effects the subscription update system. Details are not described herein again.

The actions of the first event notification network element, the source AMF network element, the target AMF network element, the UDM network element, or the NRF network element in the foregoing steps S801 to S809 may be performed by the processor 301 in the communications device 300 shown in FIG. 3 by invoking the application program code stored in the memory 303. This is not limited in this embodiment.

Figure 9:
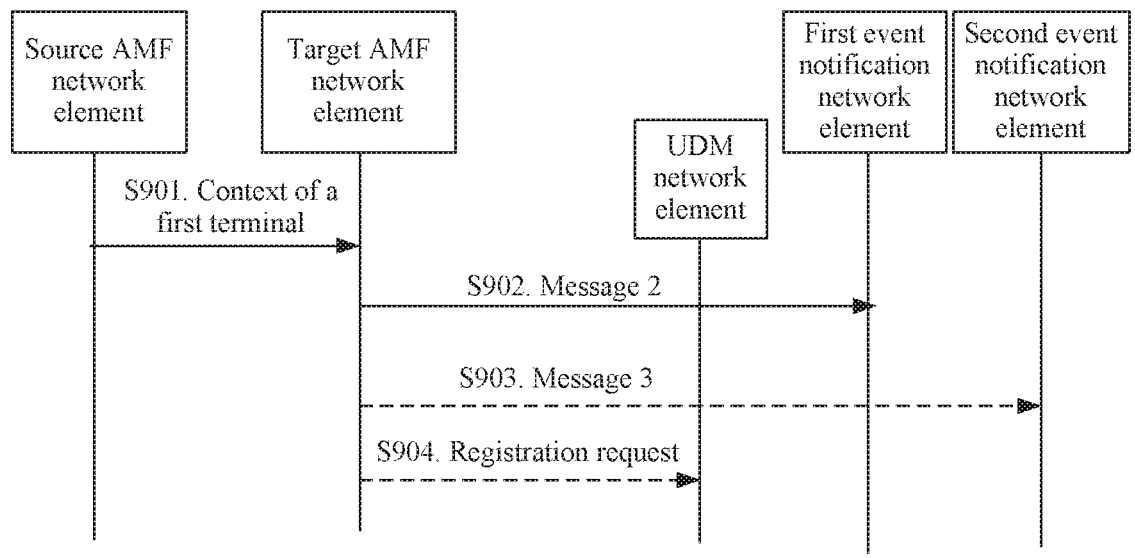
FIG. 9 is a schematic flowchart 6 of a subscription update method according to an embodiment of this application.

Optionally, an example in which the subscription update shown in FIG. 1 is applied to the 5G network shown in FIG. 2 is used, and an example in which the source subscription network element is the source AMF network element in the 5G network, and the target subscription network element is the target AMF network element in the 5G network is used. FIG. 9 shows another subscription update method provided in an embodiment of this application. The method includes the following steps.

S901. After a source AMF network element determines no longer to serve a first terminal, the source AMF network element selects a target AMF network element for the first terminal, and sends a context of the first terminal to the target AMF network element.

For related descriptions of the context of the first terminal, refer to the foregoing step S402. Details are not described herein again.

S902. This step is the same as step S413. For related descriptions, refer to the foregoing step S413. Details are not described herein again.

Optionally, the subscription update method provided in this embodiment of this application may further include the following step S903.

S903. This step is the same as step S414. For related descriptions, refer to the foregoing step S414. Details are not described herein again.

Optionally, the subscription update method provided in this embodiment of this application may further include the following step S904.

S904. This step is the same as step S412. For related descriptions, refer to the foregoing step S412. Details are not described herein again.

Optionally, in this embodiment of this application, if the first event notification network element is the UDM network element, information carried in the message 1 in step S902 and information carried in the registration request in step S904 may be sent using one message. Similarly, in this embodiment of this application, if the second event notification network element is the UDM network element, information carried in the message 2 in step S903 and information carried in the registration request in step S904 may be sent using one message. This is not specifically limited in this embodiment of this application.

According to the subscription update method provided in this embodiment of this application, a target AMF network element can learn an event notification of a subscription event in a timely manner in a scenario in which a terminal has migrated from a source AMF network element to the target AMF network element, in order to process the corresponding subscription event in a timely manner. For an analysis on related technical effects, refer to the descriptions of the technical effects the subscription update system. Details are not described herein again.

The actions of the first event notification network element, the second event notification network element, the source AMF network element, the target AMF network element, or the UDM network element in the foregoing steps S901 to S904 may be performed by the processor 301 in the communications device 300 shown in FIG. 3 by invoking the application program code stored in the memory 303. This is not limited in this embodiment.

The foregoing mainly describes the solutions provided in the embodiments of this application from a perspective of interaction between network elements. It may be understood that, to implement the foregoing functions, the source access and mobility management function network element, the target access and mobility management function network element, or the target intermediate session management network element includes corresponding hardware structures and/or software modules for performing the functions. A person skilled in the art should be easily aware that units and algorithm steps in the examples described with reference to the embodiments disclosed in this specification may be implemented in a form of hardware or in a form of a combination of hardware and computer software in this application. Whether a function is implemented by hardware or by hardware driven by computer software depends on a particular application and a design constraint of the technical solution. A person skilled in the art may use different methods to implement the described functions for each particular application, but it should not be considered that the implementation goes beyond the scope of this application.

In the embodiments of this application, function modules of the first event notification network element or the target subscription network element may be divided according to the foregoing method examples. For example, the function modules may be divided based on the functions, or at least two functions may be integrated in one processing module. The integrated module may be implemented in a form of hardware, or may be implemented in a form of a software function module. It should be noted that module division in the embodiments of this application is an example and is merely logical function division. During implementation, there may be another division manner.

Figure 10:
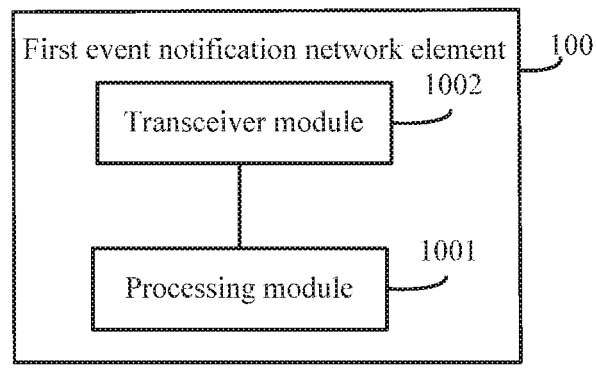
FIG. 10 is a schematic structural diagram of a first event notification network element according to an embodiment of this application.

For example, if the function modules are divided through integration, FIG. 10 shows a schematic structural diagram of a first event notification network element 100. The first event notification network element 100 includes a processing module 1001 and a transceiver module 1002.

Based on the first event notification network element 100 shown in FIG. 10, the following possible solutions may be provided.

For example, in Solution 1, the processing module 1001 is configured to determine that a notification condition of a first subscription event of a first terminal is met. The processing module 1001 is further configured to obtain first callback address information of a target subscription network element. The transceiver module 1002 is configured to send a first message to the target subscription network element based on the first callback address information, where the first message carries an identifier of the first terminal and a first event notification of the first subscription event, and the identifier of the first terminal is used to correlate the first event notification with the first terminal.

Optionally, the transceiver module 1002 is further configured to receive a second message from the target subscription network element, where the second message carries second callback address information of the target subscription network element and first indication information, the second callback address information is address information correlated with the first subscription event, the first indication information is used to determine the first subscription event, and the second callback address information is used by the first event notification network element to send a second event notification of the first subscription event to the target subscription network element based on the second callback address information.

Optionally, the transceiver module 1002 is further configured to receive a first status notification from a source subscription network element or the target subscription network element, where the first status notification carries the first callback address information of the target subscription network element. Correspondingly, that the processing module 1001 is further configured to obtain first callback address information of a target subscription network element includes the processing module 1001 being further configured to determine the first callback address information of the target subscription network element based on the first status notification.

Optionally, that the processing module 1001 is further configured to obtain first callback address information of a target subscription network element includes the processing module 1001 being further configured to: send a fourth message to a network repository function network element, where the fourth message carries second indication information and any one of the following: a first group identifier allocated by the source subscription network element to a terminal group to which the first terminal belongs, a set identifier of a subscription network element set corresponding to the first group identifier, an identifier of the target subscription network element, or an identifier of the target subscription network element and the first group identifier, and the second indication information is used to indicate that the fourth message is used to request the first callback address information of the target subscription network element; and receive the first callback address information of the target subscription network element from the network repository function network element.

Optionally, that the processing module 1001 is further configured to obtain first callback address information of a target subscription network element includes the processing module 1001 being further configured to: send a third event notification of the first subscription event to the source subscription network element based on callback address information of the source subscription network element correlated with the first terminal; and receive a rejection message from the source subscription network element, where the rejection message carries the first callback address information of the target subscription network element.

Alternatively, in Solution 2, the processing module 1001 is configured to determine that a notification condition of a first subscription event of a first terminal is met. The transceiver module 1002 is configured to send a first message to a target subscription network element, where the first message carries an identifier of the first terminal, and is used to request the target subscription network element to update subscription of the first terminal. The transceiver module 1002 is further configured to receive a second message from the target subscription network element, where the second message carries first indication information and first callback address information, correlated with the first subscription event, of the target subscription network element, the first indication information is used to determine the first subscription event, and the first callback address information is used by a first event notification network element to send a first event notification of the first subscription event to the target subscription network element based on the first callback address information.

Optionally, the processing module 1001 is further configured to obtain address information of a first service of the target subscription network element from a network repository function network element, where the first service is used to trigger a subscription update of the first subscription event. Correspondingly, that the transceiver module 1002 is configured to send a first message to a target subscription network element includes the transceiver module 1002 being configured to send the first message to the target subscription network element based on the address information of the first service.

Optionally, that the processing module 1001 is configured to obtain address information of a first service of the target subscription network element from a network repository function network element includes the processing module 1001 being configured to: send a fourth message to the network repository function network element, where the fourth message carries information about the target subscription network element and second indication information, where the second indication information is used to indicate that the fourth message is used to request the address information of the first service of the target subscription network element; and receive the address information of the first service from the network repository function network element.

According to the foregoing Solution 1 or Solution 2, optionally, the processing module 1001 is further configured to determine that the source subscription network element no longer serves the first terminal.

In an implementation, that the processing module 1001 is further configured to determine that the source subscription network element no longer serves the first terminal includes the processing module 1001 being further configured to receive a second status notification from the source subscription network element or the target subscription network element, where the second status notification is used to notify that the source subscription network element no longer serves the first terminal.

In another implementation, that the processing module 1001 is further configured to determine that the source subscription network element no longer serves the first terminal includes the processing module 1001 being further configured to: send a third event notification of the first subscription event to the source subscription network element based on callback address information of the source subscription network element correlated with the first terminal; and determine that the source subscription network element is inaccessible.

Alternatively, in Solution 3, the processing module 1001 is configured to determine that a notification condition of a first subscription event of a first terminal is met. The processing module 1001 is further configured to generate, for the first subscription event, corresponding first callback address information of a target subscription network element. The transceiver module 1002 is further configured to send a first event notification of the first subscription event to the target subscription network element based on the first callback address information.

In an implementation, the transceiver module 1002 is further configured to receive a subscription request from a source subscription network element, where the subscription request carries first callback address information of the source subscription network element corresponding to the first subscription event, and the first callback address information of the source subscription network element includes information about the source subscription network element. Correspondingly, that the processing module 1001 is further configured to generate, for the first subscription event, corresponding first callback address information of a target subscription network element includes the processing module 1001 being further configured to generate, for the first subscription event, the corresponding first callback address information of the target subscription network element based on the first callback address information of the source subscription network element corresponding to the first subscription event, where the first callback address information of the target subscription network element includes information about the target subscription network element.

Optionally, that the processing module 1001 is further configured to generate, for the first subscription event, the corresponding first callback address information of the target subscription network element based on the first callback address information of the source subscription network element corresponding to the first subscription event includes the processing module 1001 being further configured to substitute the information about the target subscription network element for the information about the source subscription network element that is in the first callback address information of the source subscription network element corresponding to the first subscription event, to obtain the corresponding first callback address information of the target subscription network element that is generated for the first subscription event.

In another implementation, that the processing module 1001 is further configured to generate, for the first subscription event, corresponding first callback address information of a target subscription network element includes the processing module 1001 being further configured to generate, for the first subscription event, the corresponding first callback address information of the target subscription network element based on a preset callback address format, where the first callback address information of the target subscription network element includes information about the target subscription network element.

All related content of the steps in the foregoing method embodiments may be cited in function descriptions of corresponding function modules. Details are not described herein again.

In this embodiment, the first event notification network element 100 is presented by dividing the function modules through integration. Herein, the "module" may be a specific ASIC, a circuit, a processor that executes one or more software or firmware programs and a memory, an integrated logic circuit, and/or another device that can provide the foregoing functions. In a simple embodiment, a person skilled in the art may figure out that the first event notification network element 100 may be in the form shown in FIG. 3.

For example, the processor 301 in FIG. 3 may invoke the computer executable instruction stored in the memory 303, such that the first event notification network element 100 performs the subscription update methods in the foregoing method embodiments.

In some embodiments, functions and implementation processes of the processing module 1001 and the transceiver module 1002 in FIG. 10 may be implemented by the processor 301 in FIG. 3 by invoking the computer executable instruction stored in the memory 303. Alternatively, functions and implementation processes of the transceiver module 1002 in FIG. 10 may be implemented by the communications interface 304 in FIG. 3, and functions and implementation processes of the processing module 1001 in FIG. 10 may be implemented by the processor 301 in FIG. 3 by invoking the computer executable instruction stored in the memory 303.

The first event notification network element 100 provided in this embodiment may perform the foregoing subscription update methods. Therefore, for technical effects that can be achieved by the first event notification network element 100, refer to the foregoing method embodiments. Details are not described herein again.

Optionally, an embodiment of this application further provides a chip system. The chip system includes a processor, configured to support the first event notification network element 100 in implementing the foregoing subscription update methods, for example, determining that a notification condition of a first subscription event of a first terminal is met. In a possible design, the chip system further includes a memory. The memory is configured to store a program instruction and data that are required for the first event notification network element 100. Certainly, the memory may alternatively be not in the chip system. The chip system may include a chip, or may include a chip and another discrete device. This is not specifically limited in this embodiment of this application.

Figure 11:
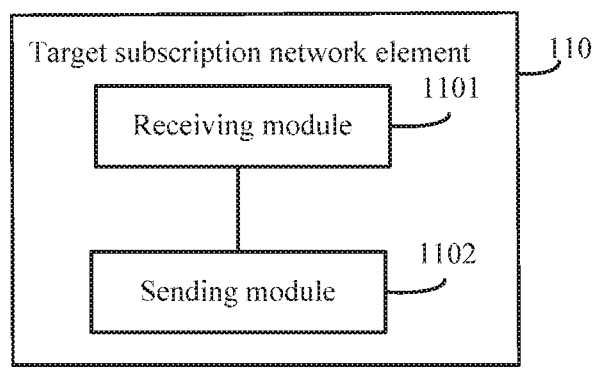
FIG. 11 is a schematic structural diagram of a target subscription network element according to an embodiment of this application.

For example, if the function modules are divided through integration, FIG. 11 shows a schematic structural diagram of a target subscription network element 110. The target subscription network element 110 includes a receiving module 1101 and a sending module 1102. The receiving module 1101 is configured to receive a first message from a first event notification network element, where the first message carries an identifier of a first terminal, and is used to request the target subscription network element to update subscription of the first terminal. The sending module 1102 is configured to send a second message to the first event notification network element based on the first message, where the second message carries first indication information and first callback address information, correlated with a first subscription event, of the target subscription network element, the first indication information is used to determine the first subscription event, and the first callback address information is used by the first event notification network element to send a first event notification of the first subscription event to the target subscription network element based on the first callback address information.

Optionally, the sending module 1102 is further configured to send a fifth message to a second event notification network element, where the fifth message carries third indication information and second callback address information, correlated with a second subscription event of the first terminal, of the target subscription network element, the third indication information is used to determine the second subscription event, and the second callback address is used by the second event notification network element to send a fourth event notification of the second subscription event to the target subscription network element based on the second callback address information.

Optionally, the receiving module 1101 is further configured to receive callback address information of the first event notification network element from the source subscription network element, where the callback address information of the first event notification network element is used to receive a status change notification of a terminal group to which the first terminal belongs. The sending module 1102 is further configured to send a status change notification to the first event notification network element based on the callback address information of the first event notification network element, where the status change notification is used to notify that the source subscription network element no longer serves a terminal in the terminal group to which the first terminal belongs.

Optionally, the sending module 1102 is further configured to send a seventh message to a network repository function network element, where the seventh message carries information about the target subscription network element and address information of a first service of the target subscription network element. The network repository function network element stores the information about the target subscription network element and the address information of the first service of the target subscription network element. The first service is used to trigger the target subscription network element to perform a subscription update.

All related content of the steps in the foregoing method embodiments may be cited in function descriptions of corresponding function modules. Details are not described herein again.

In this embodiment, the target subscription network element 110 is presented by dividing the function modules through integration. Herein, the "module" may be a specific ASIC, a circuit, a processor that executes one or more software or firmware programs and a memory, an integrated logic circuit, and/or another device that can provide the foregoing functions. In a simple embodiment, a person skilled in the art may figure out that the target subscription network element 110 may be in the form shown in FIG. 3.

For example, the processor 301 in FIG. 3 may invoke the computer executable instruction stored in the memory 303, such that the target subscription network element 110 performs the subscription update methods in the foregoing method embodiments.

In some embodiments, functions and implementation processes of the receiving module 1101 and the sending module 1102 in FIG. 11 may be implemented by the processor 301 in FIG. 3 by invoking the computer executable instruction stored in the memory 303. Alternatively, functions and implementation processes of the receiving module 1101 and the sending module 1102 in FIG. 11 may be implemented by the communications interface 304 in FIG. 3.

The target subscription network element 110 provided in this embodiment may perform the foregoing subscription update methods. Therefore, for technical effects that can be achieved by the target subscription network element 110, refer to the foregoing method embodiments. Details are not described herein again.

Optionally, an embodiment of this application further provides a chip system. The chip system includes a processor, configured to support the target subscription network element 110 in implementing the foregoing subscription update methods, for example, obtaining first callback address information, correlated with a first subscription event, of the target subscription network element. In a possible design, the chip system further includes a memory. The memory is configured to store a program instruction and data that are required for the target subscription network element 110. Certainly, the memory may alternatively be not in the chip system. The chip system may include a chip, or may include a chip and another discrete device. This is not specifically limited in this embodiment of this application.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible to a computer, or a data storage device, such as a server or a data center, integrating one or more available media. The available medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of plurality. A single processor or another unit may implement several functions enumerated in the claims. Some measures are described in dependent claims that are different from each other, but this does not mean that these measures cannot be combined to produce a better effect.

Although this application is described with reference to various features and embodiments thereof, it is to be understood that various modifications and combinations may be made to them without departing from the spirit and scope of this application. Correspondingly, the specification and accompanying drawings are merely examples of descriptions of this application defined by the appended claims, and are considered as any of or all modifications, variations, combinations, or equivalents that cover the scope of this application. A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A subscription update method performed by a first event notification network element, wherein the method comprises:
   receiving a subscription request from a source subscription network element, wherein the subscription request carries callback address information of the source subscription network element, wherein the callback address information of the source subscription network element is used for the source subscription network element to receive at least one event notification of a first subscription event, and wherein information about the source subscription network element is in the callback address information of the source subscription network element;
   determining that the source subscription network element does not serve a first terminal;
   obtaining information about a target subscription network element;
   substituting the information about the target subscription network element for the information about the source subscription network element in the callback address information of the source subscription network element;
   obtaining callback address information of the target subscription network element by substituting the information about the target subscription network element for the information about the source subscription network element, wherein the callback address information of the target subscription network element is used for the target subscription network element to receive at least one event notification of the first subscription event; and
   sending a first event notification of the first subscription event to the target subscription network element based on the callback address information of the target subscription network element.

2. The method according to claim 1, wherein the method further comprises determining that a notification condition of the first subscription event of the first terminal is met.

3. The method according to claim 1, wherein the information about the target subscription network element comprises one of an Internet Protocol (IP) address of the target subscription network element or a fully qualified domain name (FQDN) of the target subscription network element.

4. The method according to claim 3, wherein the target subscription network element is a target access and mobility management function (AMF) network element.

5. The method according to claim 1, wherein determining that the source subscription network element does not serve the first terminal comprises receiving a status notification from the source subscription network element or the target subscription network element, and wherein the status notification notifies the first event notification network element that the source subscription network element does not serve the first terminal.

6. The method according to claim 1, wherein determining that the source subscription network element does not serve the first terminal comprises:
   sending a third event notification of the first subscription event to the source subscription network element based on the callback address information of the source subscription network element correlated with the first terminal; and
   determining that the source subscription network element is inaccessible.

7. The method according to claim 1, wherein obtaining the information about the target subscription network element comprises receiving a status notification from the source subscription network element, and wherein the status notification carries the information about the target subscription network element.

8. The method according to claim 1, wherein the target subscription network element is a target access and mobility management function (AMF) network element, and wherein obtaining the information about the target subscription network element comprises:
   querying a domain name system or a network repository function network element based on AMF set information in a globally unique AMF identifier (GUAMI) corresponding to the first terminal;
   receiving fully qualified domain names or Internet Protocol addresses, returned by the domain name system or the network repository function network element, of available AMFs in an AMF network element set;
   selecting one AMF from the available AMFs as a target AMF; and
   determining a fully qualified domain name or an Internet Protocol address of the target AMF as information about the target AMF.

9. A first event notification network element, comprising:
   at least one processor; and
   a memory having computer readable instructions stored thereon that, when executed by the at least one processor, cause the first event notification network element to:
      receive a subscription request from a source subscription network element, wherein the subscription request carries callback address information of the source subscription network element, wherein the callback address information of the source subscription network element is used for the source subscription network element to receive at least one event notification of a first subscription event, and wherein the callback address information of the source subscription network element comprises information about the source subscription network element;
determine that the source subscription network element does not serve a first terminal;
obtain information about a target subscription network element;
substitute the information about the target subscription network element for the information about the source subscription network element in the callback address information of the source subscription network element;
obtain callback address information of the target subscription network element by substituting the information about the target subscription network element for the information about the source subscription network element, wherein the callback address information of the target subscription network element is used for the target subscription network element to receive at least one event notification of the first subscription event; and
send a first event notification of the first subscription event to the target subscription network element based on the callback address information of the target subscription network element.

10. The first event notification network element according to claim 9, wherein the computer readable instructions when further executed by the at least one processor, cause the first event notification network element to determine that a notification condition of the first subscription event of the first terminal is met.

11. The first event notification network element according to claim 9, wherein the information about the target subscription network element comprises one of an Internet Protocol (IP) address of the target subscription network element or a fully qualified domain name (FQDN) of the target subscription network element.

12. The first event notification network element according to claim 11, wherein the target subscription network element is a target access and mobility management function (AMF) network element.

13. The first event notification network element according to claim 9, wherein the computer readable instructions when further executed by the at least one processor, cause the first event notification network element to learn, based on a status notification, that the source subscription network element no longer serves the first terminal, wherein the status notification notifies the first event notification network element that the source subscription network element does not serve the first terminal, and wherein the status notification comes from the source subscription network element or the target subscription network element.

14. The first event notification network element according to claim 9, wherein the computer readable instructions when further executed by the at least one processor, cause the first event notification network element to:
send a third event notification of the first subscription event to the source subscription network element based on callback address information of the source subscription network element correlated with the first terminal; and
determine that the source subscription network element is inaccessible.

15. A subscription update system, comprising:
a target subscription network element; and
a first event notification network element, wherein the first event notification network element comprises at least one processor and a memory having computer readable instructions stored thereon that, when executed by the at least one processor, cause the first event notification network element to:
receive a subscription request from a source subscription network element, wherein the subscription request carries callback address information of the source subscription network element, wherein the callback address information of the source subscription network element is used for the source subscription network element to receive at least one event notification of a first subscription event, and wherein the callback address information of the source subscription network element comprises information about the source subscription network element;
determine that the source subscription network element does not serve a first terminal;
obtain information about a target subscription network element;
substitute the information about the target subscription network element for the information about the source subscription network element in the callback address information of the source subscription network element;
obtain callback address information of the target subscription network element by substituting the information about the target subscription network element for the information about the source subscription network element, wherein the callback address information of the target subscription network element is used for the target subscription network element to receive at least one event notification of the first subscription event; and
send a first event notification of the first subscription event to the target subscription network element based on the callback address information of the target subscription network element.

16. The subscription update system according to claim 15, wherein the computer readable instructions when further executed by the at least one processor, cause the first event notification network element to determine that a notification condition of the first subscription event of the first terminal is met.

17. The subscription update system according to claim 15, wherein the information about the target subscription network element comprises one of an Internet Protocol (IP) address of the target subscription network element or a fully qualified domain name (FQDN) of the target subscription network element.

18. The subscription update system according to claim 17, wherein the target subscription network element is a target access and mobility management function (AMF) network element.

19. The subscription update system according to claim 15, wherein the computer readable instructions when further executed by the at least one processor, cause the first event notification network element to receive a status notification from the source subscription network element or the target subscription network element, and wherein the status notification notifies the first event notification network element that the source subscription network element does not serve the first terminal.

20. The subscription update system according to claim 15, wherein the computer readable instructions when further executed by the at least one processor, cause the first event notification network element to:

send a third event notification of the first subscription event to the source subscription network element based on the callback address information of the source subscription network element correlated with the first terminal; and determine that the source subscription network element is inaccessible.

21. A non-transitory computer readable storage medium storing instructions that, when executed by a processor, cause the processor to perform a subscription update method comprising:

receiving a subscription request from a source subscription network element, wherein the subscription request carries callback address information of the source subscription network element, wherein the callback address information of the source subscription network element is used for the source subscription network element to receive at least one event notification of a first subscription event, and wherein the callback address information of the source subscription network element comprises information about the source subscription network element;

determining that the source subscription network element does not serve a first terminal;

obtaining information about a target subscription network element;

substituting the information about the target subscription network element for information about the source subscription network element;

obtaining callback address information of the target subscription network element by substituting the information about the target subscription network element for the information about the source subscription network element, wherein the callback address information of the target subscription network element is used for the target subscription network element to receive at least one event notification of the first subscription event; and sending a first event notification of the first subscription event to the target subscription network element based on the callback address information of the target subscription network element.

* * * * *